(12) United States Patent
Goto et al.

(10) Patent No.: US 11,886,553 B2
(45) Date of Patent: Jan. 30, 2024

(54) SERVICE PROVIDING SYSTEM, INFORMATION PROCESSING SYSTEM, CONTROL METHOD, AND MEDIUM

(71) Applicants: Kazuya Goto, Kanagawa (JP); Shogo Hatanaka, Kagoshima (JP)

(72) Inventors: Kazuya Goto, Kanagawa (JP); Shogo Hatanaka, Kagoshima (JP)

(73) Assignee: RICOH COMPANY, LTD., Tokyo (JP)

( * ) Notice: Subject to any disclaimer, the term of this patent is extended or adjusted under 35 U.S.C. 154(b) by 69 days.

(21) Appl. No.: 17/488,312

(22) Filed: Sep. 29, 2021

(65) Prior Publication Data
US 2022/0100824 A1    Mar. 31, 2022

(30) Foreign Application Priority Data

Sep. 30, 2020    (JP) ................................ 2020-166243

(51) Int. Cl.
*G06F 21/12*    (2013.01)
*G06F 21/60*    (2013.01)
(Continued)

(52) U.S. Cl.
CPC ............ *G06F 21/121* (2013.01); *G06F 21/31* (2013.01); *G06F 21/604* (2013.01); *G06F 21/107* (2023.08); *G06F 21/1015* (2023.08)

(58) Field of Classification Search
CPC ....... G06F 21/121; G06F 21/31; G06F 21/604; G06F 2221/0713; G06F 2221/0757; G06F 21/629
See application file for complete search history.

(56) References Cited

U.S. PATENT DOCUMENTS 10,114,595 B1 * 10/2018 Albert .................... G06F 3/1238
2010/0251346 A1 * 9/2010 Dumais .................. G06F 21/10
726/5
(Continued)

FOREIGN PATENT DOCUMENTS

CN    110365684 A  * 10/2019   ............. G06Q 40/02
CN    110417723 A  * 11/2019   ......... H04L 63/0407
(Continued)

OTHER PUBLICATIONS

"Autonomic software license management system: an implementation of licensing patterns", Leili Noorian, 2009 fifth international conference on autonomic and autonomous system, May 26, 2009 (Year: 2009).*

*Primary Examiner* — Duan Zhang
(74) *Attorney, Agent, or Firm* — XSENSUS LLP

(57) ABSTRACT

A service providing system includes an information processing system including an information processing apparatus including a memory and a processor; and a terminal device configured to receive execution of an application. The information processing system and the terminal device communicate with each other. The processor of the information processing apparatus is configured to execute storing information on the application of which a user has a license, and controlling a function of a first application depending on whether the user who requested execution of the first application via the terminal device, has a license of a second application.

15 Claims, 27 Drawing Sheets

(51) Int. Cl.
*G06F 21/10* (2013.01)
*G06F 21/31* (2013.01)

(56) References Cited

U.S. PATENT DOCUMENTS

| | | | | |
|---|---|---|---|---|
| 2014/0073299 | A1* | 3/2014 | Ham | H04W 4/50 455/414.3 |
| 2019/0295439 | A1* | 9/2019 | Odell | G06F 3/0484 |
| 2020/0012468 | A1 | 1/2020 | Tokuchi | |

FOREIGN PATENT DOCUMENTS

| | | | |
|---|---|---|---|
| CN | 111405016 A | * | 7/2020 |
| JP | 2015-038717 | | 2/2015 |
| JP | 2020-010096 | | 1/2020 |

* cited by examiner

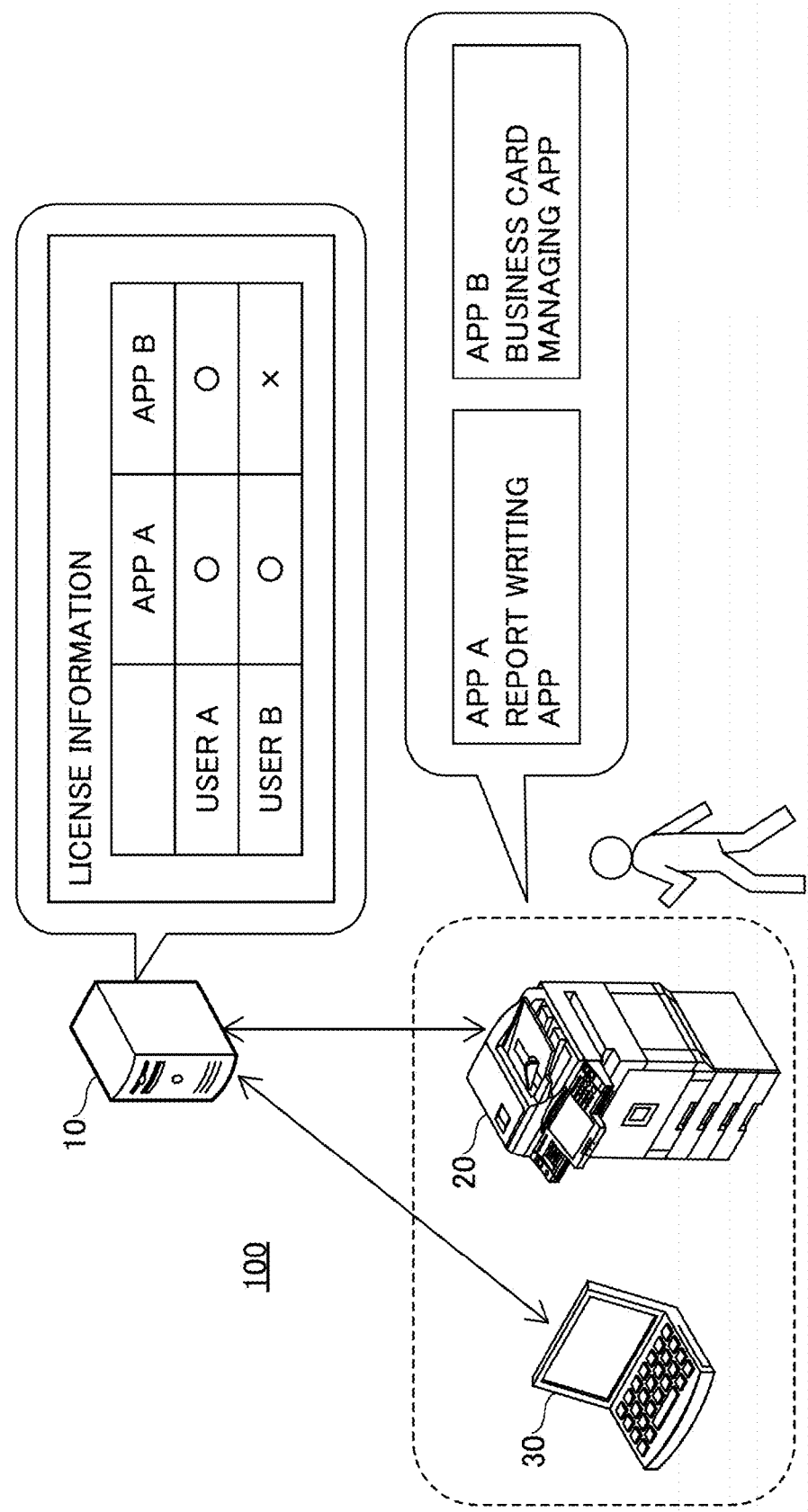

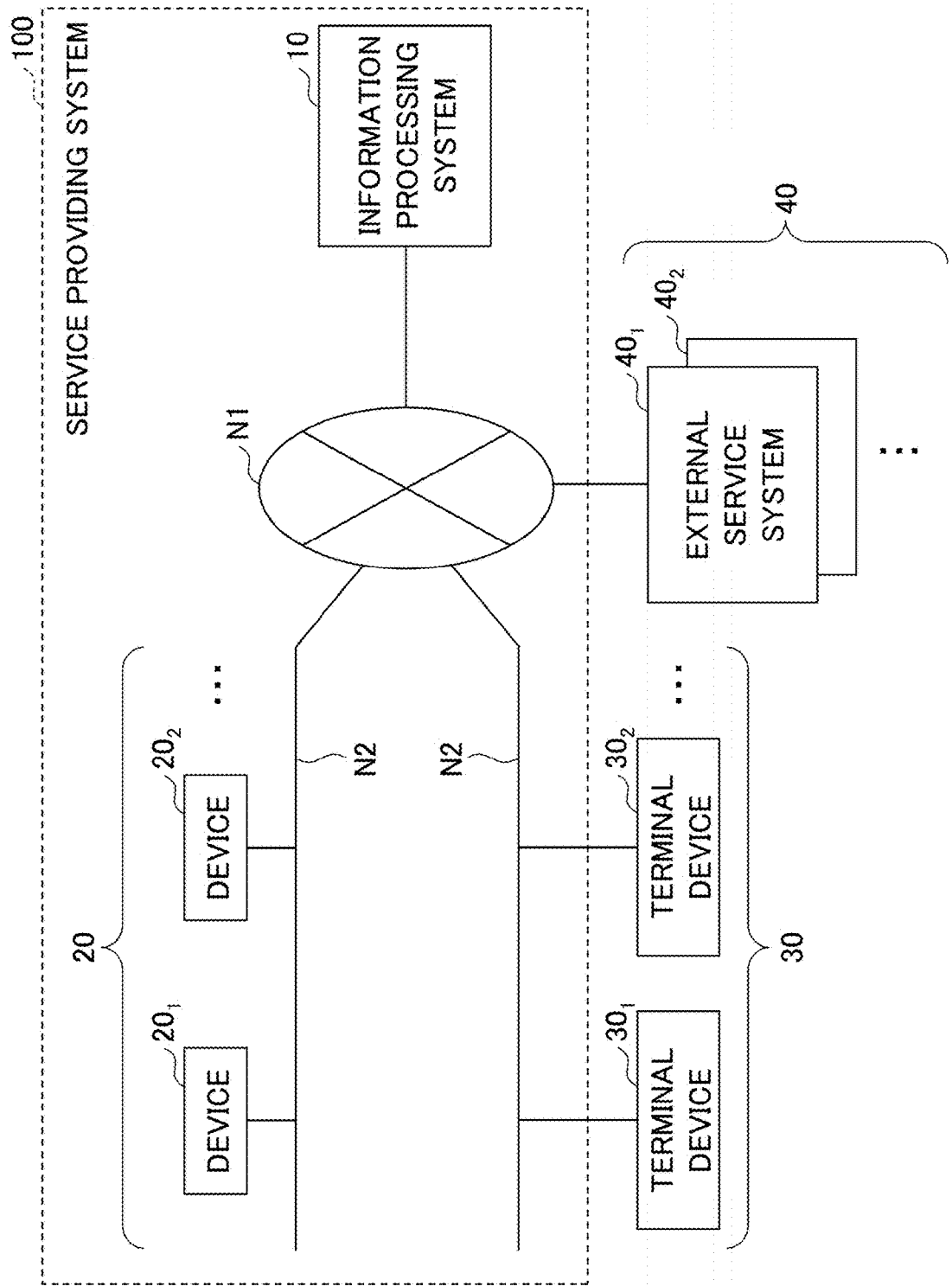

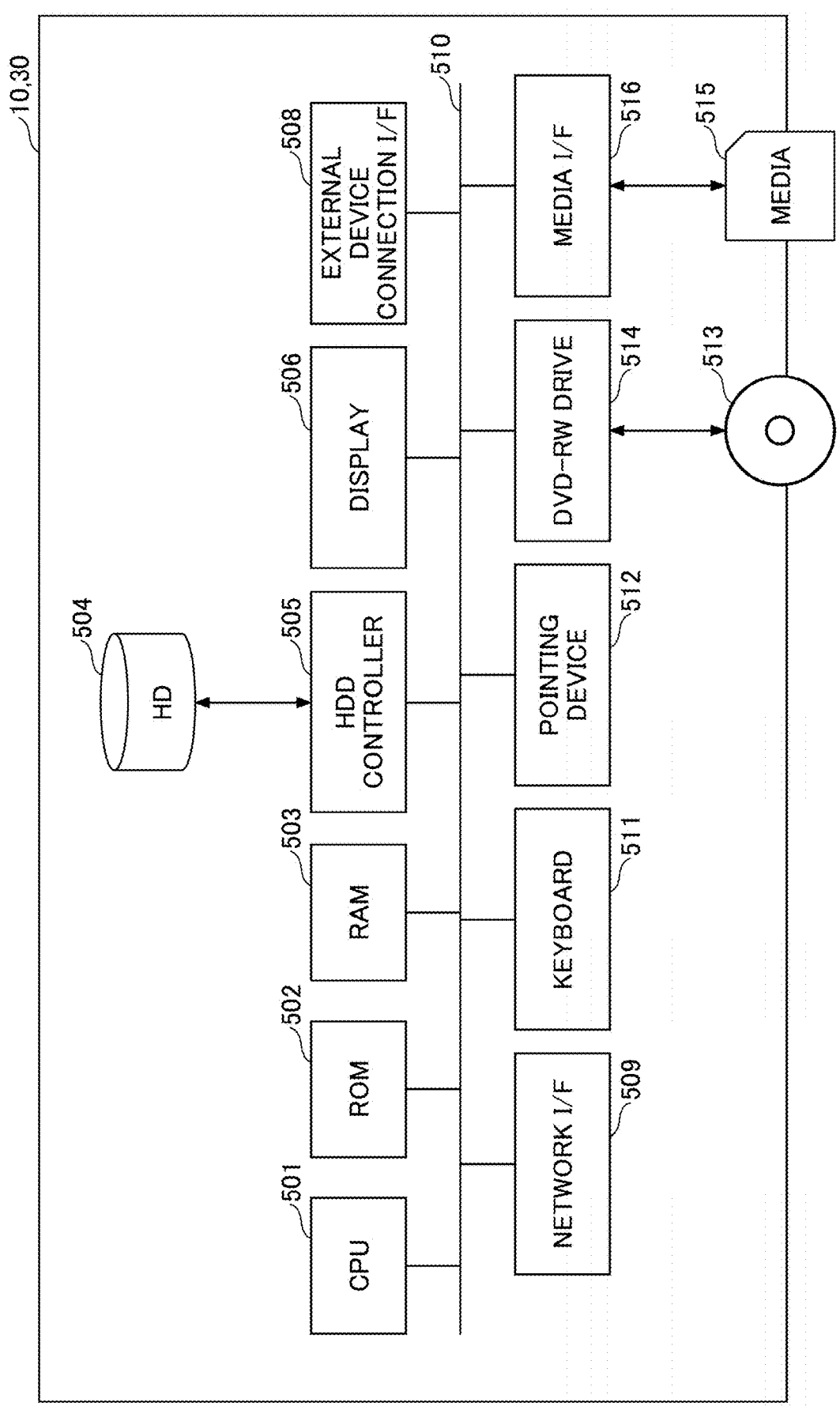

FIG.6

```
{
    "appId" : "app001",         }1201A
    "appName" : "REPORT MANAGEMENT APP",  }1202A
    "flowDetails" : [                                  1203A
        {
            "component" : "report_service",   ~1204
            "operation" : "data_edit"   ~1205
            "parameters" : [
                "Cooporation" : "app002"   ~1206
            ]
        }
    ]
}
```

| CUSTOMER NAME | ADDRESS | INDUSTRY | CATEGORY | UPDATE DATE |
|---|---|---|---|---|
| COMPANY A | CITY A, PREF. OO ··· | SERVICE | CATEGORY 4 | 2020/8/5 |
| COMPANY B | CITY B, PREF. XX ··· | MANUFACTURING | CATEGORY 4 | 2020/8/5 |
| COMPANY C | CITY C, PREF. YY ··· | SALES | CATEGORY 4 | 2020/8/5 |
| COMPANY D | CITY D, PREF. ZZ ··· | INSURANCE | CATEGORY 4 | 2020/8/5 |
| COMPANY E | CITY E, PREF. OX ··· | SERVICE | CATEGORY 4 | 2020/8/5 |
| COMPANY F | CITY F, PREF. OY ··· | MANUFACTURING | CATEGORY 4 | 2020/8/5 |
| COMPANY G | CITY G, PREF. OZ ··· | SALES | CATEGORY 4 | 2020/8/5 |
| COMPANY H | CITY H, PREF. XO ··· | INSURANCE | CATEGORY 4 | 2020/8/5 |

FIG.10

BUSINESS CARD MANAGEMENT

MANAGER MODE  decade.aaa101
OFF  TENANT ID: 1187845420

Q ENTER KEYWORDS — 151

☑ I AM THE OWNER — 153

ALL | UNCONFIRMED — 155

— 152

— 150

— 154

| IMAGE | NAME | CONTACT | TAG | DATE OF RECEIPT ▾ |
|---|---|---|---|---|
| ☐ [card: MEISHIDO CORP. MEISHI, TARO] | MEISHI, TARO GROUP 2, MEISHIDO CORP. | efshe+111@messttt.co.jp 092-123-4567 | | 2020/8/3 |
| ☐ [card: UNCONFIRMED FIRST DIVISION, PLANNING OFFICE, MINISTRY OF OO MEISHI, JIRO] | MEISHI, JIRO FIRST DIVISION, PLANNING OFFICE, MINISTRY OF OO | meishi@tsubaki.ne.jp 03-0123-4455 090-1234-5678 | | 2020/8/3 |

Figure 13:
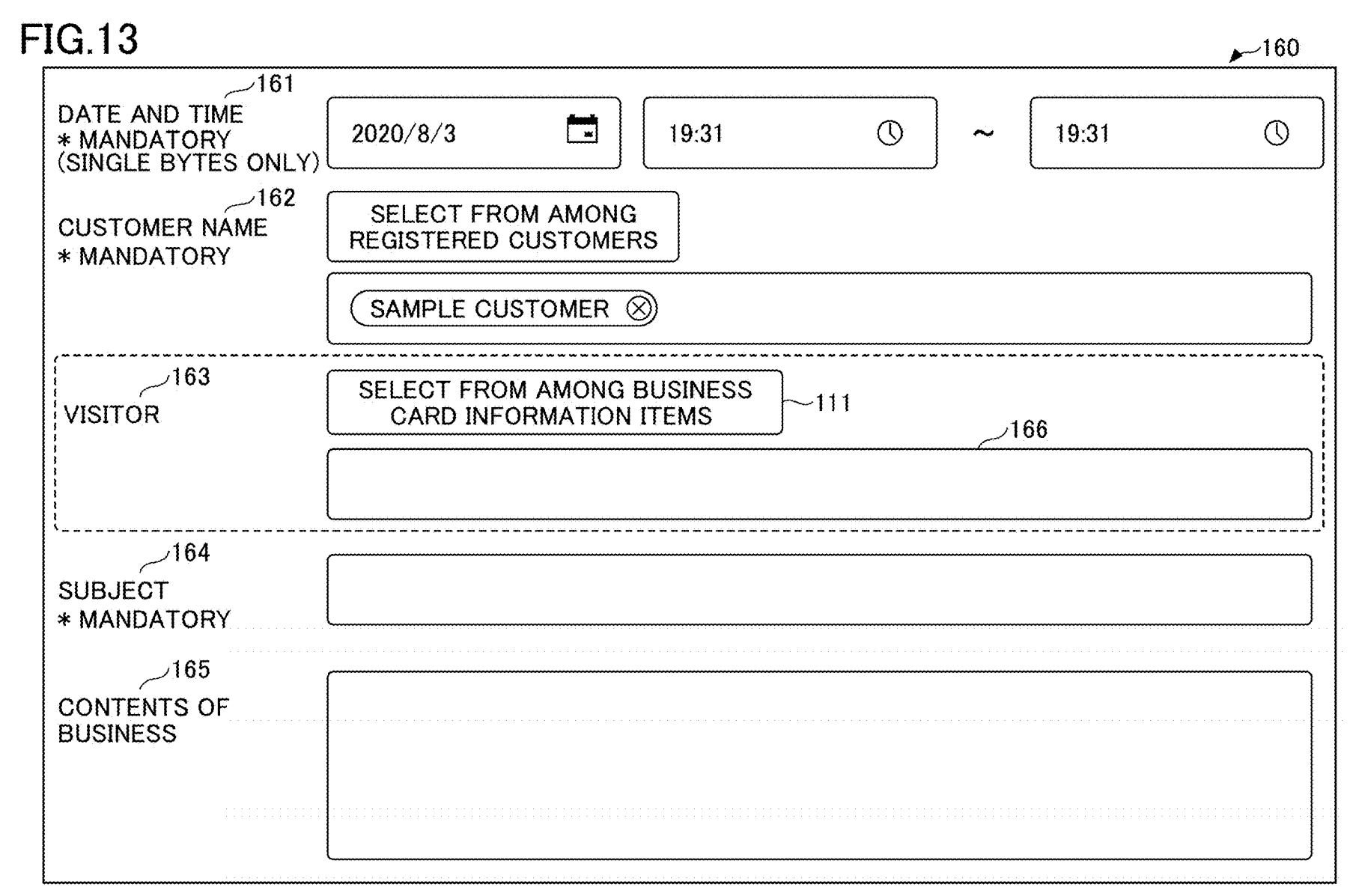

- 161 DATE AND TIME *MANDATORY (SINGLE BYTES ONLY): 2020/8/3 | 19:31 ~ 19:31
- 162 CUSTOMER NAME *MANDATORY: SELECT FROM AMONG REGISTERED CUSTOMERS — SAMPLE CUSTOMER ⊗
- 163 VISITOR: SELECT FROM AMONG BUSINESS CARD INFORMATION ITEMS — 111
- 164 SUBJECT *MANDATORY
- 165 CONTENTS OF BUSINESS 160, 166

FIG.14

| | | | |
|---|---|---|---|
| DATE AND TIME *MANDATORY (SINGLE BYTES ONLY) ~161 | 2020/8/3 | 19:31 | ~ 19:31 |
| CUSTOMER NAME *MANDATORY ~162 | SELECT FROM AMONG REGISTERED CUSTOMERS | | |
| VISITOR ~163 | SAMPLE CUSTOMER ⊗ | | ~166 |
| SUBJECT *MANDATORY ~164 | | | |
| CONTENTS OF BUSINESS ~165 | | | |

SELECT A VISITOR

🔍 ABCD CORPORATION

☑ SATO, TAKESHI
SALES DIVISION, ABCD CORP.

☑ SUZUKI, KEIKO
SALES DIVISION, ABCD CORP.

☐ TANAKA, JIRO
SALES DIVISION, ABCD CORP.

☐ YAMADA, ICHIRO
SALES DIVISION, ABCD CORP.

RETURN    SELECT

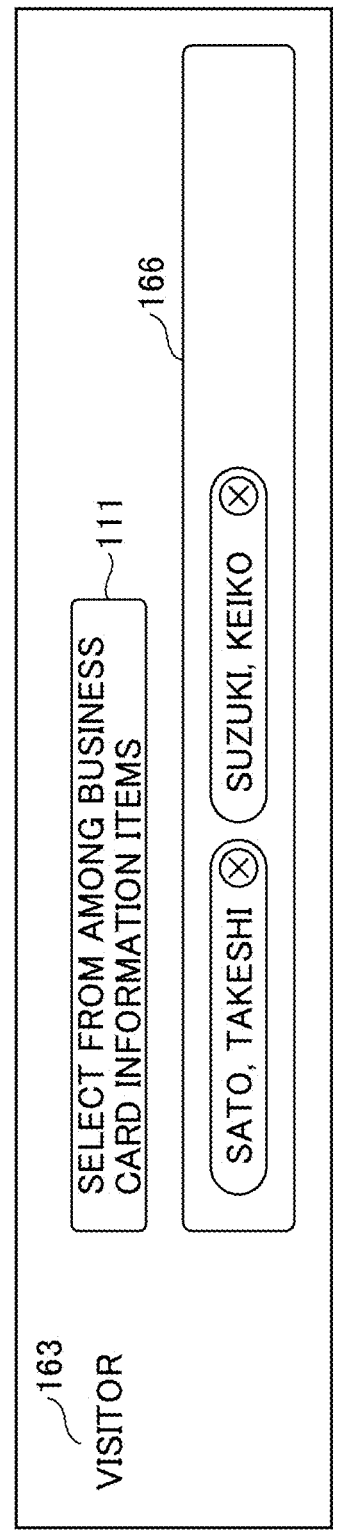

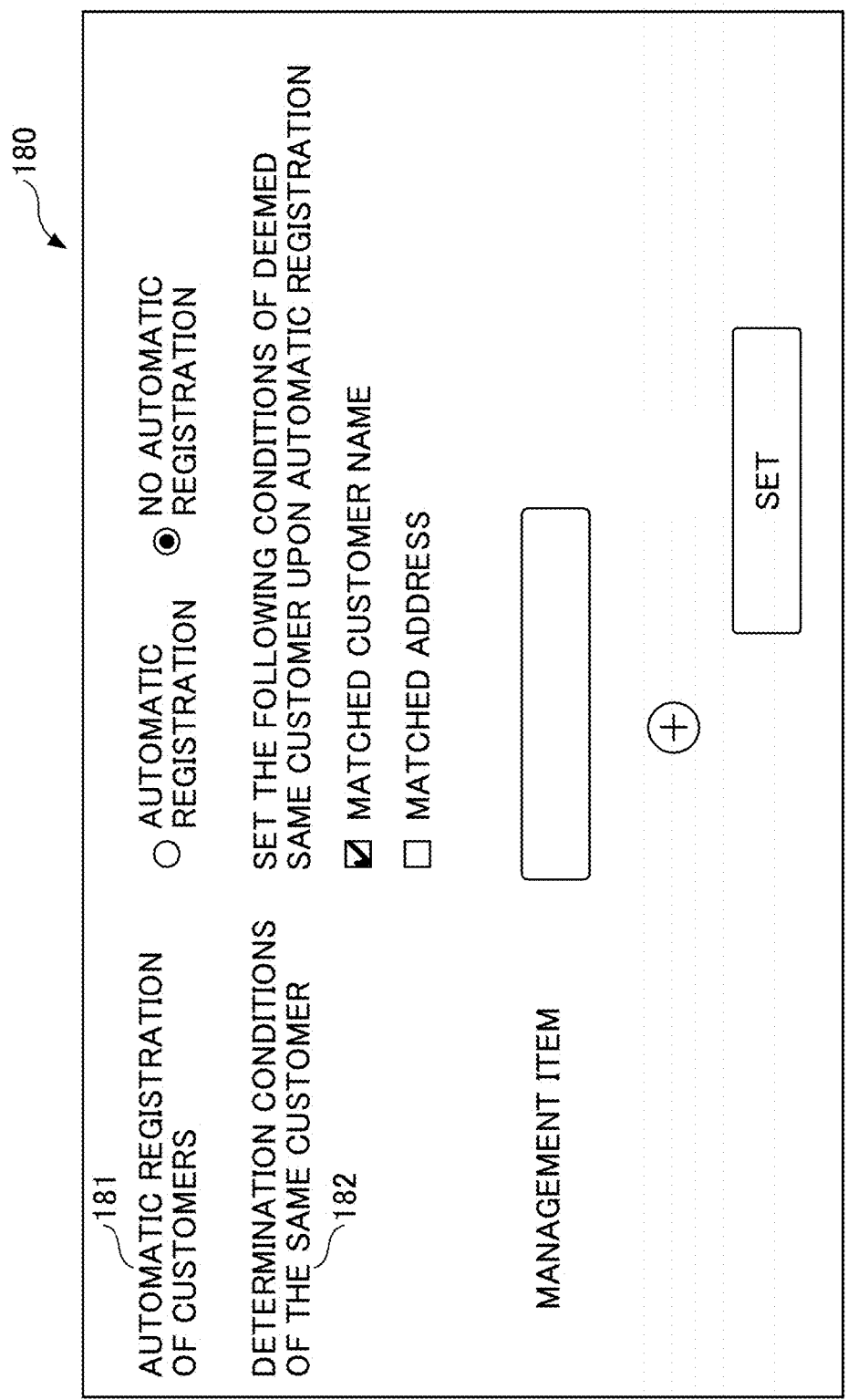

FIG.16B

CONDITION OF AUTOMATIC NAME IDENTIFICATION ~191

○ AUTOMATIC NAME IDENTIFICATION  ● NO AUTOMATIC NAME IDENTIFICATION

☑ MATCHED FULL NAME
☑ MATCHED EMAIL ADDRESS  } 192
☐ MATCHED COMPANY NAME

MANAGEMENT ITEM  ⊕

SET

| CUSTOMER NAME | ADDRESS | INDUSTRY | CATEGORY | UPDATE DATE |
|---|---|---|---|---|
| COMPANY A | CITY A, PREF. OO ...... | SERVICE | CATEGORY 4 | 2020/8/5 |
| COMPANY B | CITY B, PREF. XX ...... | MANUFACTURING | CATEGORY 4 | 2020/8/5 |

FIG.18B

| IMAGE DATA | NAME | CONTACT | TAG | DATE OF RECEIPT |
|---|---|---|---|---|
| ***.jpg | MEISHI, TARO GROUP 2, MEISHIDO CORP. | efshe+111@messttt.co.jp 092-123-4567 | | 2020/08/3 |
| ***.jpg | MEISHI, JIRO FIRST PLANNING DIVISION, (MINISTRY OF OO) | meishi@tsubaki.ne.jp 03-0123-4455 090-1234-5678 | | 2020/8/3 |

FIG.18C

| CUSTOMER NAME | ADDRESS | INDUSTRY | CATEGORY | UPDATE DATE |
|---|---|---|---|---|
| COMPANY A | CITY A, PREF. OO ...... | SERVICE | CATEGORY 4 | 2020/8/5 |
| COMPANY B | CITY B, PREF. XX ...... | MANUFACTURING | CATEGORY 4 | 2020/8/5 |
| MINISTRY OF OO | ...... | | | 2020/8/18 |

FIG.19

| LINKING APP ID | APP NAME | LINKED APP | SCREEN INFORMATION | APP PROCESSING INFORMATION | AUTOMATIC LINKAGE SETTING | SHARED APP | EXTERNAL SERVICE SYSTEM |
|---|---|---|---|---|---|---|---|
| app001 | REPORT MANAGEMENT APP | app002 | SCREEN SETTING INFORMATION 1-1 (AVAILABLE LICENSE) SCREEN SETTING INFORMATION 1-2 (NO LICENSE) | PROCESS FLOW INFORMATION 1 | OFF | - | - |
| app002 | BUSINESS CARD MANAGEMENT APP | app003 | SCREEN SETTING INFORMATION 2 | PROCESS FLOW INFORMATION 2-1 (AVAILABLE LICENSE) PROCESS FLOW INFORMATION 2-2 (NO LICENSE) | - | - | - |
| app003 | CUSTOMER MANAGEMENT APP | app002 | SCREEN SETTING INFORMATION 3 | PROCESS FLOW INFORMATION 3 | ON | - | - |
| app004 | ...... | | | | | ...... | ...... |

FIG.20A

|  | APP A | APP B |
|---|---|---|
| TENANT 1 | ○ | ○ |
| TENANT 2 | ○ | ○ |
| TENANT 3 | ○ | ○ |
| TENANT 4 |  | ○ |
| TENANT 5 |  | ○ |
| TENANT 6 |  |  |
| TENANT 7 | ○ |  |
| TENANT 8 | ○ |  |
| TENANT 9 | ○ | ○ |
| TENANT 10 | ○ | ○ |

FIG.20B

| USER ID | USER NAME | EMAIL ADDRESS | PASSWORD | AVAILABLE APPS (INCLUDING LINKING APP) | AUTHENTICATION INFORMATION ON EXTERNAL SERVICE SYSTEM | LINKAGE SETTING ||
|---|---|---|---|---|---|---|---|
| | | | | | | EXTERNAL SERVICE SYSTEM A | EXTERNAL SERVICE SYSTEM B |
| U001 | TOKKYO, HANAKO | hanako@sample.com | **** | app111 | SUBDOMAIN: company USER NAME: tokkyo PASSWORD: **** | SET | NOT SET |
| | | | | app112 | USE AUTHENTICATION INFORMATION OF MANAGER A | ... | ... |
| U002 | TOKKYO, TARO | taro@sample.com | ***** | app111 | SUBDOMAIN: company USER NAME: taro PASSWORD: **** | SET | SET |
| | | | | app112 | USE AUTHENTICATION INFORMATION OF MANAGER A | | |
| | | | | app113 | USER ID: taro_tokkyo1234 PASSWORD: **** | ... | ... |
| U003 | JITSUYO, ICHIRO | ichiro@sample.com | ****** | app112 | USE AUTHENTICATION INFORMATION OF MANAGER A | NOT SET | SET |
| | | | | app113 | USER ID: ichiro227 PASSWORD: **** | ... | ... |

FIG.21A

| LINKING APP ID | LINKED APP ID | SPACE ID | SETTING SCREEN OF LINKING APP |
|---|---|---|---|
| app011 | 2575 | S001 | SCREEN 001 |
| app012 | 2576 | S001 | SCREEN 002 |
| app013 | 2577 | S001 | SCREEN 003 |
| app014 | 2578 | S001 | SCREEN 004 |
| app015 | 2579 | S001 | SCREEN 005 |
| app016 | 2580 | S001 | SCREEN 006 |

FIG.21B

| FIELD CODE 1 | FIELD CODE 2 | ... |
|---|---|---|
| FIELD CODE FOR IMAGE | FIELD CODE FOR OO | ... |
| ... | ... | ... |
| ... | ... | ... |
| ... | ... | ... |
| ... | ... | ... |
| ... | ... | ... |

FIG.22

|  | AUTOMATIC LINKAGE SETTING ON | AUTOMATIC LINKAGE SETTING OFF |
|---|---|---|
| AVAILABLE LICENSE | AUTOMATIC LINKAGE | BUTTON DISPLAY (LINKABLE) |
| NO LICENSE | NO LINKAGE | UNLINKABLE |

SERVICE PROVIDING SYSTEM, INFORMATION PROCESSING SYSTEM, CONTROL METHOD, AND MEDIUM

CROSS-REFERENCE TO RELATED APPLICATIONS

The present application is based upon and claims the benefit of priority under 35 U.S.C. § 119 of Japanese Patent Application No. 2020-166243 filed on Sep. 30, 2020, the entire contents of which are hereby incorporated by reference.

BACKGROUND OF THE INVENTION

1. Field of the Invention

The present disclosure relates to a service providing system, an information processing system, a control method, and a medium.

2. Description of the Related Art

Users may execute applications useful for their work (simply referred to as "applications", hereafter) on information processing devices or various devices. For example, an application can communicate with an information processing system on a network, output data processed by the information processing system, and store the data on the network. The customer may purchase a license of an application required for business individually. The purchased application can be executed by a license-granted user of the customer.

Some applications incorporate a function for linkage with other applications, and linkage of multiple applications are expected to improve business productivity (see, for example, Japanese Patent Application Laid-Open No. 2020-10096 (Patent Document 1)). Patent Document 1 discloses a method of linking multiple applications, and using different applications from a specific application.

However, in the conventional technique, there has been a problem that the function of the first application cannot be controlled depending on whether the user executing the first application has a license of the second application. In the following, this problem will be further described. Even if the user executes the first application, there may be cases where the user does not have a license of the second application. If the user can use the non-licensed second application via the first application, a problem in terms of the contract may arise (i.e., the user can use the second application even though the user did not purchase a license). In order to prevent this, for example, one may consider setting the second application not to be executable on the provider side of the application; however, this may bring inconvenience such as the time and effort taken in the setting work.

SUMMARY OF THE INVENTION

According to an embodiment, a service providing system includes an information processing system including an information processing apparatus including a memory and a processor; and a terminal device configured to receive execution of an application. The information processing system and the terminal device communicate with each other. The processor of the information processing apparatus is configured to execute storing information on the application of which a user has a license, and controlling a function of a first application depending on whether the user who requested execution of the first application via the terminal device, has a license of a second application.

BRIEF DESCRIPTION OF DRAWINGS

FIG. 1A is a diagram illustrating an outline of operations executed by a service providing system according to a present embodiment;

FIG. 2 is a diagram illustrating an example of a system configuration of the service providing system according to the present embodiment;

FIG. 3 is a diagram illustrating an example of a hardware configuration of an information processing system and a terminal device according to the present embodiment;

FIG. 6 is a diagram illustrating an example of application processing information stored in an application processing information storage unit;

FIG. 9 illustrates an example of a screen of a customer management application displayed on a terminal device in the case where the customer management application is executed;

FIG. 10 illustrates an example of a screen of a business card management application displayed on a terminal device in the case where the business card management application is executed;

FIG. 13 is an example of a screen of a linking application (report writing application) that can be linked with a linked application, displayed on a ten final device;

FIG. 14 is an example of a screen of a linking application (report writing application) that is unlinkable with a linked application, displayed on a terminal device;

FIG. 15A illustrates an example of a screen of business card information displayed by a report writing application in the case where a button labeled "select from among business card information items" is pressed;

FIG. 15B illustrates another example of a screen of business card information displayed by a report writing application in the case where the button labeled "select from among business card information items" is pressed;

FIG. 16A illustrates an example of a setting screen on which a user sets whether to cause a linking application to execute automatic linkage;

FIG. 16B illustrates another example of a setting screen on which a user sets whether to cause a linking application to execute automatic linkage;

FIG. 18A is a diagram illustrating data transmitted from a business card management application to a customer management application;

FIG. 18B is another diagram illustrating data transmitted form a business card management application to a customer management application;

FIG. 18C is a further diagram illustrating data transmitted from a business card management application to a customer management application;

FIG. 19 illustrates an example of information held in an application processing information storage unit;

FIG. 20A illustrates an example of information on users managed in a user management unit;

FIG. 20B illustrates another example of information on users managed in a user management unit;

FIG. 21A illustrates an example of application data stored in an application data storage unit;

FIG. 21B illustrates another example of application data stored in an application data storage unit; and FIG. 22 illustrates contents of operations executed by the information processing system depending on whether the setting of automatic linkage is turned on or off, and whether the user has a license of a linked application.

DETAILED DESCRIPTION OF THE EMBODIMENTS

In the following, as an example of an embodiment for implementing the present inventive concept, a method of controlling executed by a service providing system and a service providing system will be described with reference to the drawings.

According to an embodiment, a service providing system can be provided that controls a function of a first application depending on whether a user has a license of a second application.

Overview of Operations

Figure 1B:
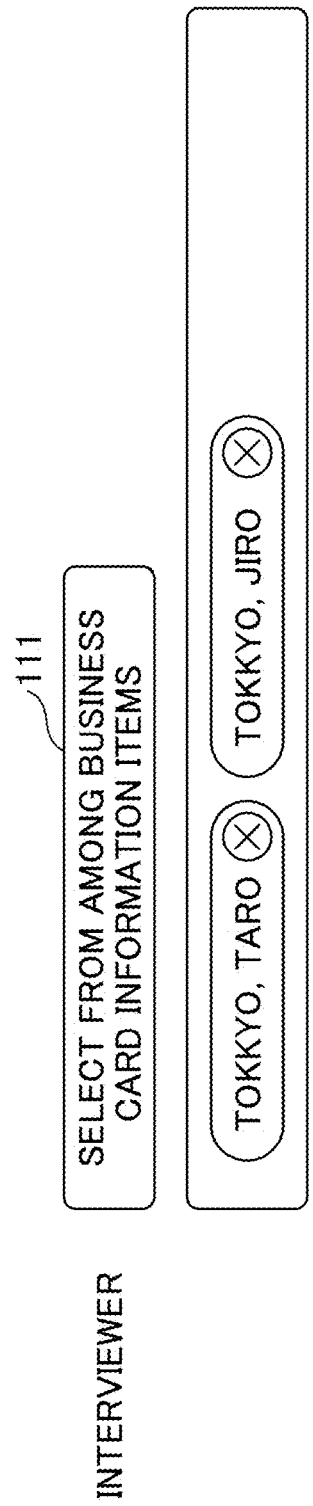
FIG. 1B is another diagram illustrating an outline of operations executed by a service providing system according to the present embodiment.
Figure 1C:
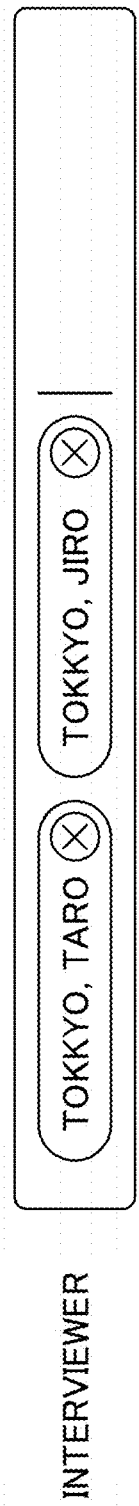
FIG. 1C is a further diagram illustrating an outline of operations executed by a service providing system according to the present embodiment.

FIGS. 1A-1C are diagrams illustrating an outline of operations executed by a service providing system according to the present embodiment. FIG. 1A illustrates a general configuration of a service providing system. A customer who owns a terminal device 30 or a device 20 has already purchased a license of the application A and a license of the application B. The application A is an application that supports the user in writing a report such as a business report. The application B is an application that electronically takes in (captures an image of) a paper business card, to convert the name and the like into character information by an OCR (Optical Character Reader). Also, the application B manages the name and the like converted into the character information item by item.

The terminal device 30 or the device 20 can communicate with the information processing system 10 via a network. In the case where a condition that the user has a license is satisfied, the terminal device 30 or the device 20 can execute the application A and the application B provided on the information processing system 10 as web applications, individually. Also, in the information processing system 10, licenses held by the respective users (that have been assigned within a customer) are managed for each application. For example, a user A has a license of the application A and a license of the application B, whereas a user B only has a license of the application A.

The application A and the application B are applications independent from each other, and can be executed individually by each user. Also, the application A has a linkage function with the application B that enables the user, in the case where using the application A to write a report, to obtain names of employees of a visited company from the application B so as to incorporate the names into the report.

In the case where the user A operates the terminal device 30 or the device 20, and the terminal device 30 or the device 20 requests the information processing system 10 to execute the application A, the information processing system 10 determines that the user A has a license of the application B. Therefore, the information processing system 10 provides the terminal device 30 or the device 20 with a screen including a button 111 labeled "select from among business card information items" for the application A to obtain names and the like from business card information managed by the application B.

FIG. 1B illustrates a screen of the application A displayed on the terminal device 30 or the device 20 in the case where the user A executes the application A. This screen includes the button 111 labeled "select from among business card information items". Once the user A presses the button, the business card information incorporated from business cards by the application B can be displayed, and when the user selects an interviewer from among the business card information items, the name of the interviewer is registered in the report.

If the user B requests the information processing system 10 to execute the application A, the information processing system 10 determines that the user B has no license of the application B. Therefore, the information processing system 10 provides the terminal device 30 or the device 20 with a screen not including a button 111 labeled "select from among business card information items" with which names and the like could be obtained from the business card information managed by the application B.

FIG. 1C illustrates a screen of the application A displayed on the terminal device 30 or the device 20 in the case where the user B executes the application A. This screen does not include a button 111 labeled "select from among business card information items". Therefore, the user B cannot register names and the like from the business card information in the report, and needs to register the names and the like manually.

In this way, in the case where a linking application is executed, the service providing system of the present embodiment can control a function of the linking application according to the contractual information on a linked application to be linked with the linking application. For example, the service providing system controls displaying and hiding of items for establishing linkage with the linked application on the screen of the linking application. Therefore, in the case where a user having a license of a linking application does not have a license of a linked application, the linking application can be prevented from establishing a linkage with the linked application.

Terminology

The linkage means that two or more parties can execute processing together in collaboration. In the present embodiment, the linkage means that a linking application of the information processing system 10 interoperates with another application (a linked application), so that the information processing system 10 can provide a service. A linking application interoperating with a linked application means that, for example, the linking application obtains data from the linked application, or the linking application transmits data to the linked application.

Tenants mean information representing multiple customers sharing the same software, namely, companies and the like as a group of customers. An application contracted by a tenant can be used by users within the tenant, and an administrator or the like of the tenant can grant each of the users execution permission of multiple software instances (each of which is an application or a package of multiple applications) present in the system.

An application (also may be referred to as an app in the present specification) is a program executed by a terminal device and an information processing system for a user to receive a service. A program executed by the terminal device or the device and the information processing system (a server) in collaboration is also referred to as a web application. A web application often runs on a Web browser. An application may be for example, a workflow application that executes a series of operations sequentially. An application can be constructed by an administrator or the like by combining components. Multiple applications may be licensed as a package of the applications.

A linking application is a user-activated application. A linking application can be linked with a linked application. A linking application is a web application that is provided by a server and a client executing communication. Which linking application can be linked with which linked application is defined in advance in the applications or in the information processing system 10.

A linked application is an application that provides data (data simply needs to be items related to the linked application to be obtained by a linking application, and includes not only user data but also names and the like); provides the linking application with at least part of functions of the linked application; or receives data from the linking application. The information processing system 10 may provide a linked application, or an external system may provide a linked application. Note that the external system is not a mandatory element in the present embodiment.

A server is a computer or software that carries out a function of providing information and processing results in response to a request from a client. A screen obtained by a client from a server and displayed may be called a Web page. Also, a linking application is not limited to be a Web application, and may be provided as a native application. A native application is an application installed on a local storage device, and does not require a web browser.

The information processing system 10 provides services, and one of the means of providing services is execution of a linking application. In some cases, upon execution of a linking application, the linking application may (or may not) be linked with a linked application provided by an external system. As the service by the linking application is implemented in a form of executing a series of operations sequentially, the contents and order of the series of operations are defined in the linking application. Such a series of operations may include only one operation.

The external system also provides services, and one of the means of providing services is execution of a linked application. The external system can provide a service for a user without linking to the information processing system 10, and in this case, a linked application provided on the external system is a web application provided through communication between the server and the client. The service providing system 100 of the present embodiment allows the user to use a linked application of the external system that is available for the user from the terminal device 30 or the like, via the information processing system 10 from the terminal device 30 or the device 20.

A service may be referred to as an application (app), and may also be referred to as a program, software, site, and the like. In other words, even if not referred to as an "application", it simply needs to be a software object related to a service on the service providing system 100 or the external system.

A user means a what-is-called end user on the customer side, who is a person using the terminal device 30 or the device 20 including a linking application. An administrator is a person who assigns a license to each user so that the user can use an application, or makes settings related to the application. The administrator is deployed on the customer side (tenant side). However, there is no need to clearly distinguish the user from the administrator, and the terms are merely used expediently in the present embodiment.

Controlling a function of an application means, for example, at least one of enabling or disabling the function of the application, and executing or not executing the function of the application. Therefore, the function of the application may be changed. In the present embodiment, an example in which a linking application controls displaying or hiding information on a linked application, and an example in which a linking application transmits data to a linked application, will be described.

A first application displaying information on a second application means the first application displaying a button, an icon, or a menu related to the second application, and data and the like managed by the second application. The information on the second application may be configured to be capable of receiving an operation performed by the user. Data managed by the second application may be displayed in response to a press operation performed on a button, icon, menu, or the like.

<System Configuration>

First, a system configuration of the service providing system 100 according to the present embodiment will be described with reference to FIG. 2. FIG. 2 is a diagram illustrating an example of a system configuration of the service providing system 100 according to the present embodiment.

The service providing system 100 illustrated in FIG. 2 includes the information processing system 10, the devices 20, and the terminal devices 30 that are communicably connected to one another via a wide area network N1 such as the Internet. The service providing system 100 also communicates with external systems 40 as external systems.

The information processing system 10 is implemented by one or more information processing apparatuses, to provide various services implemented through a series of operations linked with the external system 40 providing cloud services and the like via the network N1. Specific examples of the services provided on the information processing system 10 according to the present embodiment will be described later. The information processing system 10 may be implemented by cloud computing, or may be implemented by a single information processing apparatus. Cloud computing is a form of using resources on a network while the user is unaware of specific hardware resources. The information processing system 10 may be present on the Internet, or present on-premises. Note that a series of operations is provided by one linking application, and a series of operations will be also referred to as a "process flow" or a "workflow".

The devices 20 include various types of electronic devices used by users. The devices 20 may include, for example, an image forming device such as an MFP (Multifunction Peripheral), a PC (Personal Computer), a projector, an electronic blackboard, a video conference terminal, a digital camera, and the like. The devices 20 are connected to the network N2. By using the device 20, the user can use various services provided by at least one of the information processing system 10 and the external systems 40.

Note that in the following, in the case of distinguishing the multiple devices 20 from one another, each is denoted with a subscript such as a device $20_1$, a device $20_2$, and so on.

The terminal devices 30 are, for example, a desktop PC, a notebook PC, a smartphone, a tablet terminal, and the like used by the administrator or the user. The terminal devices 30 are connected to the network N2. The administrator or the user operating the terminal device 30 can use various services provided on the information processing system 10 or the external systems 40, and can make settings of a linked application or a linking application.

Note that in the following, in the case of distinguishing the multiple terminal devices 30 from one another, each is denoted with a subscript such as a terminal device $30_1$, a terminal device $30_2$, and so on.

The external systems 40 are one or more information processing apparatuses that provide services by executing linked applications via the network N1. Data is managed or processed by executing a linked application, and the data itself or the processing result is taken as the service. The term "external" in the external system 40 means that the system is a system separate from the information processing system 10. The external systems 40 are often operated by different companies. For example, even the same user has different login IDs and the like for the external systems 40 and for the information processing system 10. In the present embodiment, a linked application may be executed by both of the external system 40 and the information processing system 10.

As examples of the external systems 40, there are, for example, a cloud service, an ASP (Application Service Provider), and the like, and various external services provided via a network may also be included. For example, as an example of a service, a database handling a tabular format may be considered. The external system 40 may be present on the Internet, or present on-premises.

Note that in the following, in the case of distinguishing the multiple external systems 40, the illustrated "external system $40_1$" may be denoted as an external system A, and the "external system $40_2$" may be denoted as an external system B, and so on.

<Example of Hardware Configuration>

With reference to FIG. 3, a hardware configuration of the information processing system 10 and the terminal devices 30 included in the service providing system 100 according to the present embodiment will be described.

<<Information Processing System and Terminal Device>>

FIG. 3 is a diagram illustrating an example of a hardware configuration of the information processing system 10 and the terminal device 30 according to the present embodiment. As illustrated in FIG. 3, each of the information processing system 10 and the terminal devices 30 is constituted with a computer that includes a CPU 501, a ROM 502, a RAM 503, an HD 504, an HDD (hard disk drive) controller 505, a display 506, an external device connection I/F (Interface) 508, a network I/F 509, a bus line 510, a keyboard 511, a pointing device 512, a DVD-RW (Digital Versatile Disk Rewritable) drive 514, and a media I/F 516.

Among these, the CPU 501 controls overall operations of the information processing system 10 and the terminal devices 30. The ROM 502 stores a program used for driving the CPU 501, such as an IPL. The RAM 503 is used as a work area of the CPU 501. The HD 504 stores various items of data of programs and the like. The HDD controller 505 controls reading or writing of various items of data on the HD 504 under control of the CPU 501. The display 506 displays various items of information such as a cursor, a menu, a window, a character, an image, and the like. The external device connection I/F 508 is an interface for connecting various external devices. In this case, the external devices include, for example, a USB (Universal Serial Bus) memory, a printer, and the like. The network I/F 509 is an interface for executing data communication using the network N2. The bus line 310 is constituted with an address bus, a data bus, and the like for electrically connecting the components illustrated in FIG. 5 including the CPU 501 and the like.

Also, the keyboard 511 is a type of input unit provided with multiple keys used for inputting characters, numbers, various commands, and the like. The pointing device 512 is a type of input unit for selecting and executing various commands, selecting an object to be processed, moving a cursor and the like. The DVD-RW drive 514 controls reading and writing of various items of data on the DVD-RW 513 as an example of a removable recording medium. Note that the DVD-RW drive 514 may be capable of handling not only DVD-RW, but also DVD-R and the like. The media I/F 516 controls reading and writing (storing) of data on a recording medium 515 such as a flash memory.

<Device>

Figure 4:
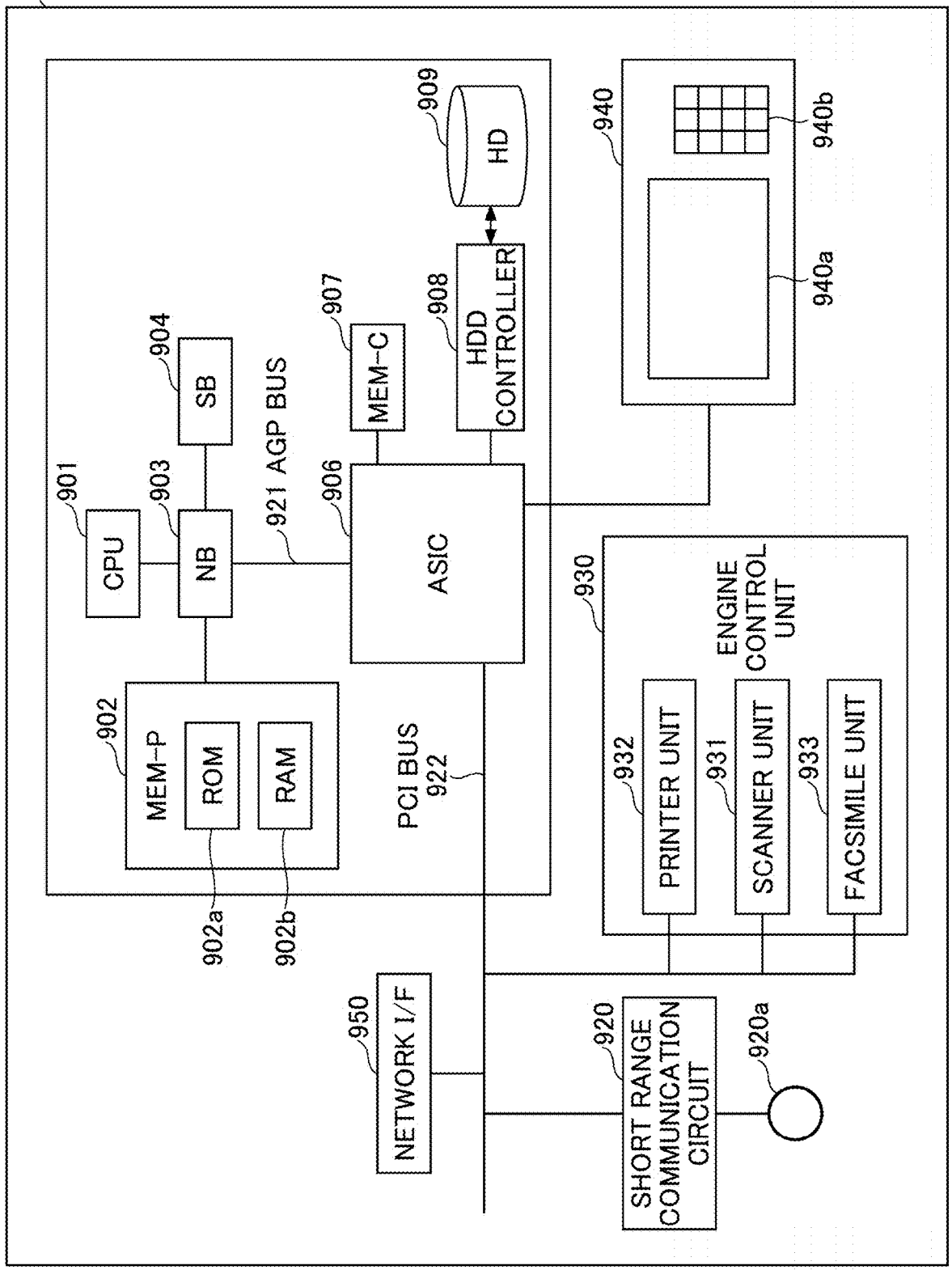
FIG. 4 is a hardware configuration diagram of an image forming device as an example of a device.

FIG. 4 is a hardware configuration diagram of an image forming device as an example of the device 20. As illustrated in FIG. 4, the image forming device includes a controller 910, a short range communication circuit 920, an engine control unit 930, an operation panel 940, and a network I/F 950.

Among these, the controller 910 includes a CPU 901 as a main component of a computer, a system memory (MEM-P) 902, a north bridge (NB) 903, a south bridge (SB) 904, an ASIC (Application Specific Integrated Circuit) 906, a local memory (MEM-C) 907 as a storage unit, an HDD controller 908, and an HD 909 as a storage unit, and is configured to have the NB 903 connected with the ASIC 906 via an AGP (Accelerated Graphics Port) bus 921.

Among these, the CPU 901 is a control unit that executes overall control of the image forming device. The NB 903 is a bridge for connecting the CPU 901 to the MEM-P 902, the SB 904, and the AGP bus 921, and includes a memory controller to control reading and writing data with the MEM-P 902, a PCI (Peripheral Component Interconnect) master, and an AGP target.

The MEM-P 902 includes a ROM 902a as a memory for storing programs that implement functions of the controller 910 and data, and a RAM 902b that is used for loading the program and the data, and used as a memory for rendering upon memory printing. Note that a program stored in the RAM 902b may be configured as a file in an installable format or an executable format that can be recorded on a computer-readable recording medium such as CD-ROM, CD-R, or DVD to be distributed.

The SB 904 is a bridge for connecting the NB 903 to PCI devices and peripheral devices. The ASIC 906 is an IC (Integrated Circuit) for image processing applications that includes hardware elements for image processing, and has a roll of a bridge connecting the AGP bus 921, the PCI bus 922, the HDD controller 908, and the MEM-C 907 to one another. This ASIC 906 is constituted with a PCI target, an AGP master, an arbitrator (ARB) that forms the core of the ASIC 906, a memory controller to control the MEM-C 907, multiple DMACs (Direct Memory Access Controllers) to execute operations of rotation and the like of image data by hardware logic or the like, and a PCI unit to transfer data to and from a scanner unit 931, a printer unit 932, and a facsimile unit via the PCI bus 922. Note that the ASIC 906 may be connected with an interface of USB (Universal Serial Bus) and an interface of IEEE 1394 (Institute of Electrical and Electronic Engineers 1394).

The MEM-C 907 is a local memory used as an image buffer for copying and a buffer for encoding. The HD 909 is a storage device storing image data, storing font data used upon printing, and storing forms. The HDD controller 908 controls reading or writing of data on the HD 509 under control of the CPU 901. The AGP bus 921 is a bus interface for graphics accelerator cards, proposed for speeding up graphic processing, and can speed up the graphics accelerator cards by directly accessing the MEM-P 902 at high throughput.

Also, the short range communication circuit 920 includes an antenna 920a for a short range communication circuit. The short range communication circuit 920 is a communication circuit such as NFC, Bluetooth (registered trade mark), or the like.

Further, the engine control unit 930 includes the scanner unit 931, the printer unit 932, and the facsimile unit 933. Also, the operation panel 940 includes a panel display unit 940a such as a touch panel to display current setting values, a selection screen, and the like to receive input from the operator, and hard keys 940b that include numeric keys to receive setting values of conditions related to image forming such a condition of density setting; a start key to receive a copy start command; and the like. The controller 910 controls the entire image forming device, and controls, for example, rendering, communication, input from the operation panel 940, and the like. The scanner unit 931 or the printer unit 932 includes image processing parts to execute error diffusion, gamma conversion, and the like.

Note that by pressing an application switching key on the operation panel 940, the user can switch and select a function of the image forming device sequentially from among a document box function, a copy function, a printer function, and a facsimile function. In the case where the document box function is selected, the document box mode is turned on; in the case where the copy function is selected, the copy mode is turned on; in the case where the printer function is selected, the printer mode is turned on; and in the case where the facsimile function is selected, the facsimile mode is turned on.

Also, the network I/F 950 is an interface for executing data communication using the network N2. The short range communication circuit 920 and the network I/F 950 are electrically connected to the ASIC 906 via the PCI bus 922.

<Functions>

Figure 5:
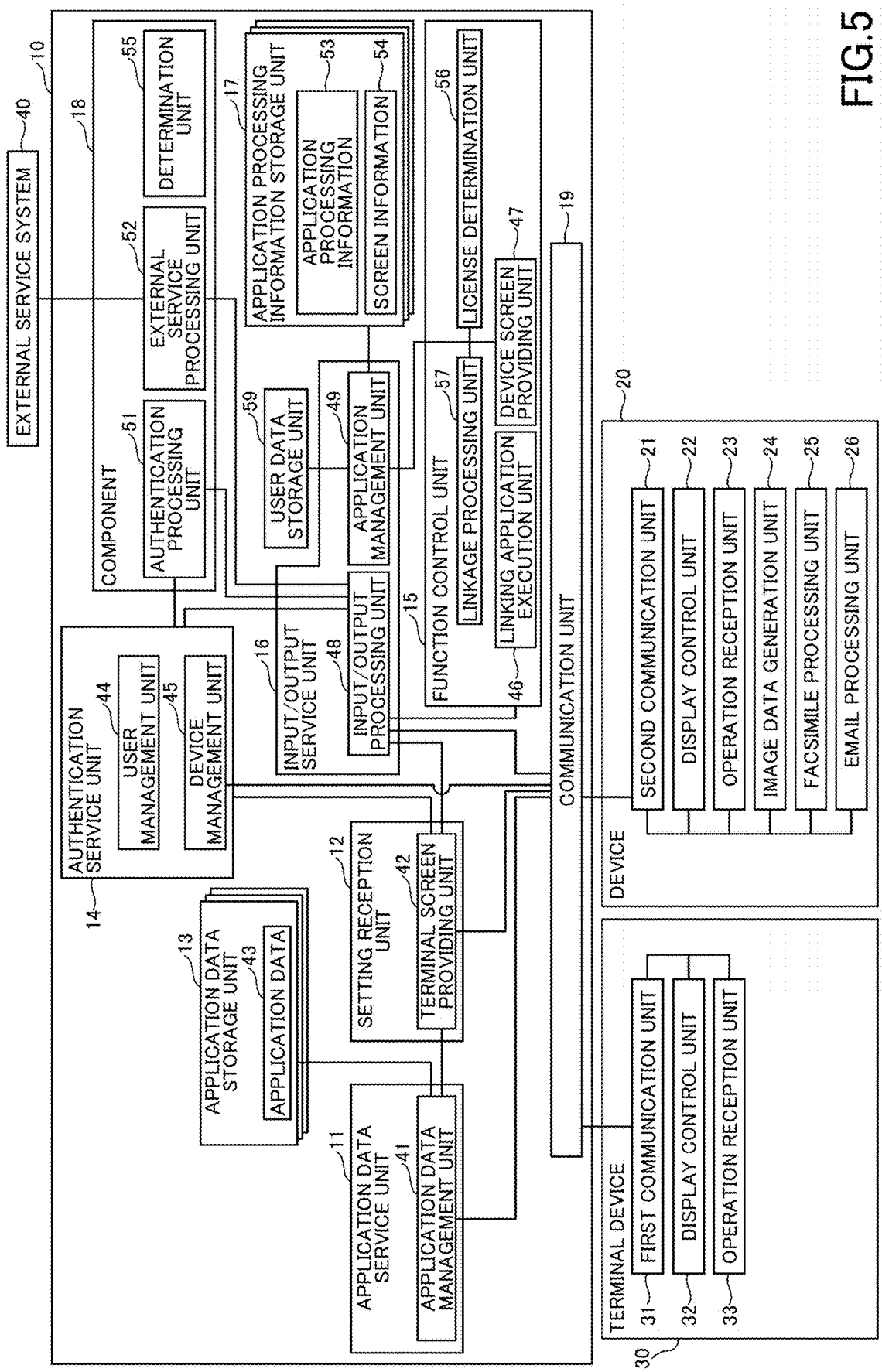
FIG. 5 is a diagram illustrating an example of a functional configuration of the service providing system according to the present embodiment.

Next, a functional configuration of the service providing system 100 according to the present embodiment will be described with reference to FIG. 5. FIG. 5 is a diagram illustrating an example of a functional configuration of the service providing system 100 according to the present embodiment.

<Device>

First, the device 20 includes a second communication unit 21, a display control unit 22, an operation reception unit 23, an image data generation unit 24, a facsimile processing unit 25, and an email processing unit 26. Each of these functional units is a functional element or means implemented by the CPU 901 executing instructions included in one or more programs installed in the device 20. For example, the second communication unit 21, the display control unit 22, and the operation reception unit 23 are implemented by a web browser, and the other units are implemented by individual applications (native applications).

The second communication unit 21 transmits and receives various items of information with the information processing system 10. In the present embodiment, the second communication unit 21 receives screen information on a screen for listing linking applications and the like from the information processing system 10, and transmits image data and the like to the information processing system 10.

The display control unit 22 interprets the screen information on various screens, to display the screens on the panel display unit 940a. The operation reception unit 23 receives various operations performed by the user on the various screens displayed on the panel display unit 940a.

In the case where a linking application corresponding to a selection received by the operation reception unit 23 is an application to generate image data, the image data generation unit 24 causes the scanner unit 931 to scan a document, to generate the image data. The facsimile processing unit 25 executes processing related to reception and transmission of facsimiles by the facsimile unit 933, and in the case of receiving a facsimile, requests the information processing system 10 to execute a linking application that is associated with facsimile reception in advance. Note that the facsimile processing unit 25 may request the information processing system 10 to execute a linking application corresponding to the sender (fax number) of the facsimile.

The email processing unit 26 executes processing related to reception and transmission of emails, and in the case of receiving an email, requests the information processing system 10 to execute a linking application that is associated with email reception in advance. Note that the email processing unit 26 may request the information processing system 10 to execute a linking application corresponding to the sender (email address) of the email.

<<Terminal Device>>

The terminal device 30 includes a first communication unit 31, a display control unit 32, and an operation reception unit 33. Each of these functional units is a functional element or means implemented by the CPU 501 executing instructions included in one or more programs installed in the terminal device 30. Note that the program may be a Web browser, or may be dedicated software.

The first communication unit 31 transmits and receives various items of information with the information processing system 10 or the external system 40. In the present embodiment, various types of screen information are received from the information processing system 10 or the external system 40, and the information set by the administrator or the user is transmitted to the information processing system 10 or the external system 40.

The display control unit 32 interprets the screen information on various screens, to display the screens on the display 506. The operation reception unit 33 receives various operations performed by the user on the various screens displayed on the display 506.

<<Information Processing System>>

The information processing system 10 includes an application data service unit 11, a setting reception unit 12, an authentication service unit 14, a function control unit 15, an input/output service unit 16, a component 18, and a communication unit 19. Each of these functional units is a functional element or means implemented by the CPU 501 executing instructions included in one or more programs installed in the information processing system 10. Both linking applications and linked applications are provided on the information processing system 10.

The communication unit 19 transmits and receives various items of information with the terminal device 30 and the device 20. The setting reception unit 12 provides a setting site for various types of settings for the terminal device 30, and receives settings on the setting site. A site may refer to a web page or a web application, or a system on the server side that provides a web page or a web application for the terminal device 30. For example, the administrator may enter a setting whether to automatically link a linking application with a linked application on this setting site.

The setting reception unit 12 includes a terminal screen providing unit 42, and the terminal screen providing unit 42 provides various types of setting screens for the administrator to set information necessary to execute a linking application. Note that the terminal screen providing unit 42 generates screen information written in HTML, XML, CSS (Cascade Style Sheet), JavaScript (registered trademark), and the like in response to an HTTP request from the terminal device 30, and transmits the generated screen information to the terminal device 30 as an HTTP response.

The application data service unit 11 includes an application data management unit 41. The application data management unit 41 manages application data 43 of a purchased linking application for each tenant. The application data 43 is data for associating a linking application with a linked application. Note that the application data 43 is stored in the application data storage unit 13.

The function control unit 15 provides screen information for the terminal device 30 or the device 20, and receives execution of a linking application from the terminal device 30 or the device 20. The function control unit 15 includes a linking application execution unit 46, a device screen providing unit 47, a license determination unit 56, and a linkage processing unit 57. The linking application execution unit 46 receives execution of a linking application from the terminal device 30 or the device 20, and requests the input/output processing unit 48 to process the linking application based on application processing information 53. The device screen providing unit 47 uses screen information 54 to provide screen information on a screen for listing linking applications and the like, for the terminal device 30 or the device 20. The license determination unit 56 determines whether a user who has logged in has a license of a linked application. The linkage processing unit 57 links a linking application with a linked application. The linkage processing unit 57 can obtain user data from the linked application, or transmit user data of the linking application to the linked application.

The input/output service unit 16 executes input and output of data, by using the authentication service unit 14 or the component 18. The input/output service unit 16 includes an input/output processing unit 48 and an application management unit 49. The input/output processing unit 48 executes a linking application requested from the linking application execution unit 46. In the case of executing the linking application, the input/output service unit 16 refers to the application processing information 53, to request the component 18 to execute operations included in the linking application.

The application management unit 49 manages the application processing information 53 and the screen information 54 of a linking application stored in the application processing information storage unit 17. The application processing information 53 includes settings of a linking application in terms of an execution order of operations (e.g., with which application the linking application establishes linkage, whether to make a request for execution to the external system 40 after OCR, and the like). The screen information 54 is information on screens displayed on the terminal device 30 or the device 20, such as a screen for listing linking applications, a screen for setting each application, and the like. The application processing information storage unit 17 stores the application processing information 53 and the screen information 54 for each linking application.

The authentication service unit 14 executes processing related to authentication of a user (including an administrator) and the device 20. The authentication service unit 14 includes a user management unit 44 and a device management unit 45. The user management unit 44 manages information on users. The user management unit 44 holds authentication information such as, for example, each user name and each password. Also, the authentication information includes items related to the information processing system 10 and items related to the external system 40. The device management unit 45 manages each of the devices 20 associated with a tenant. In other words, the device management unit 45 manages the identification information on each tenant in association with a corresponding device 20, and hence, once a device 20 is identified, the tenant can be identified.

The component 18 is a generic term for individual functional units that execute respective processes in practice. One block in the component 18 corresponds to one process. The component 18 includes, for example, an authentication processing unit 51, an external service processing unit 52, and a determination unit 55. The authentication processing unit 51 is a component 18 that requests the authentication service unit 14 to execute authentication. The external service processing unit 52 is a component 18 to make a request for execution to the external system 40. In other words, the external service processing unit 52 is a functional unit to establish linkage with the external system 40. The external service processing unit 52 is provided for each type of external system 40. The determination unit 55 makes various types of determinations, to control branching in a processing flow. Note that other than those illustrated in the figure, the external service processing unit 52 may include components such an OCR unit, a translation unit, and the like.

FIG. 19 illustrates an example of information held by an application processing information storage unit 17. The application processing information storage unit 17 includes records of linking applications each having fields of linking application ID, application name, linked application, screen information, application processing information, setting of automatic linkage, shared application, and external system.

The field of linking application ID represents identification information to identify the linking application.

The field of application name represents the name of the linking application assigned by an application developer or administrator.

The field of linked application represents an application to be linked with the linking application. Note that in the example in FIG. 19, app001 is to be linked with app002, and app002 is to be linked with app003. These linkage relationships are merely examples.

The field of screen information represents a program written in HTML or the like that is used in the case where the terminal device 30 or the device 20 displays an icon or a screen for setting a linking application. In some cases, the screen information as such may be provided in two types depending on whether the user has a license of the linked application or not. For example, in the case of app001 being a linking application, screen definition information 1-1 is screen information in the case where the user has a license of the linked application, and screen definition information 1-2 is screen information in the case where the user does not have a license of the linked application. Instead of providing two types of screen information in the application processing information storage unit 17, one type of screen information may be provided, with which the screen display can be switched dynamically.

The field of application processing information defines the contents and order (processing flow) of a series of operations executed by an application. In some cases, an application only has a single processing flow. Also, in some cases, the application processing information 53 may be provided in two types depending on whether the user has a license of the linked application or not. For example, in the case of app002 being a linking application, processing flow information 2-1 is application processing information in the case where the user has a license of the linked application, and processing flow information 2-2 is application processing information in the case where the user does not have a license of the linked application. Instead of providing two types of processing flows in the application processing information storage unit 17, one type of processing flow may be provided, with which processing flow can be switched dynamically.

The field of setting of automatic linkage represents a setting regarding whether the linking application automatically (without an intervening operation performed by the user) establishes linkage with a linked application. For example, as the setting of automatic linkage of app001 is turned off, in order to establish linkage between app001 and a linked application (to obtain business card information), an intervening operation performed by the user is required. As the setting of automatic linkage of app003 is turned on, app003 establishes linkage with a linked application (to receive business card information automatically) without an intervening operation performed by the user. As app002 does not receive data from another application, the setting of automatic linkage is undefined.

The field of shared application indicates that the linking application is an application that can be commonly used among users of a tenant, whereas for an ordinary (non-shared) linking application, use permission needs to be granted for each user.

The field of external system represents the identification information on an external system 40 in the case where the linking application is linked with a linked application provided on the external system 40.

In the case where a user logs in from the terminal device 30 or the device 20, the application management unit 49 provides the terminal device 30 or the device 20 with a list of linking applications for each of which the user has a license. Also, in the case where one of the linking applications is designated in the list of linking applications, the application management unit 49 identifies the screen information 54 and the application processing information 53 associated with the linking application.

Note that the user data storage unit 59 stores user data held by each application. For example, in the case of a business card management application, the names and the like of employees of each customer are stored. Also, in the case of a report writing application, dates and times of activities and the contents of the activities are stored. In the case of a customer management application, the respective names and the like of customers are stored (see FIGS. 18A-18C). This user data storage unit 59 may be included in the information processing system 10, or may be stored in another storage device such as the external system 40. Note that the user data storage unit 59 manages the user data in association with each user ID.

FIGS. 20A-20B illustrate examples of information on users managed by the user management unit 44. First, FIG. 20A illustrates relationships between tenants and applications. In other words, each tenant can purchase an application discretionarily, and in FIG. 20A, a circle mark is displayed on an application owned by the tenant. Within each tenant, the administrator grants a license to each user within the tenant. This license represents execution permission of a linking application or a linked application (contractual state) for the user.

FIG. 20B illustrates authentication information on users of a certain tenant, and linking applications of which the users have respective licenses. As the information on each user, FIG. 20B includes a record of fields including user ID, user name, mail address, password, available applications, authentication information on external systems, and linkage settings, in the information processing system 10. The users also include an administrator.

The fields of at least one of user ID, user name, and mail address, and the field of password represent authentication information for the user to log in on the information processing system 10.

The field of available applications shows applications for each of which the user has a license. The licensed applications include a linking application. The available applications include a personal application and a shared application. Both the personal application and the shared application are used by multiple users; the personal application uses authentication information on an external service registered by the individual user, whereas the shared application uses authentication information on an external service shared by the multiple users. In FIG. 20B, app112 is a shared application. The others are personal applications. In the case of a personal application, it is necessary for each user to register authentication information on the external system 40.

The field of authentication information on external systems represents authentication information for the user to log in on each external system 40. The authentication information may differ from one external system 40 to another. In this way, each user of the service providing system 100 is associated one-to-one with a user of the external system 40. Note that it is not necessary to be associated one-to-one, and in the case where there are multiple linking applications that use the same external system 40, the user of the service providing system 100 may be associated with a user of the external system 40 that may be different application by application. Therefore, the information processing system 10 identifies a user (user identification information or the like) on the external system 40 to be linked according to the user information including the user ID, password, and the like on the information processing system 10 obtained from the terminal device 30 or the device 20.

The field of linkage setting becomes "SET" if the user wishes to establish linkage with the external system 40, and is confirmed to be able to log in with the authentication information on the external system 40. The linkage setting is used for determining whether the user can execute an application of the external system 40. Note that the fields of authentication information and linkage setting of the external system 40 do not need to be set in the case where the linking application does not establish linkage with any of the applications on the external system 40.

Also, the authentication information simply needs to be the authentication information on the external system 40 or the authentication information necessary to link with the external system. Other than the user ID and the password, the authentication information may be a token or the like obtained from the external system 40 when setting the linkage with the external system 40.

FIGS. 21A-21B illustrate examples of application data stored in the application data storage unit 13. A record of the application data includes, in association with the external system 40, fields of linking application ID, linked application ID, space ID, linking application setting screen (FIG. 21A), and n (one or more) items of field codes (FIG. 21B). Note that the field codes may be stored separately from the other fields as shown in the figures. The linked application may be of the information processing system 10 or of the external system 40.

Each field code represents information to specify which data item in the linking application is stored in which field in the linked application. For example, scanned image data is registered as to be stored in the field of field code 1. Note that the term field in "field code" is an item and corresponds to a column in a database having a tabular format.

<Application Processing Information>

Next, the application processing information will be described in detail with reference to FIG. 6. FIG. 6 is a diagram illustrating an example of application processing information stored in an application processing information storage unit 17.

The application processing information 53 illustrated in FIG. 6 is that of a report writing application used by a user who operates the terminal device 30 to write a report. The application processing information 53 includes an application ID 1201A representing the identification information on the application processing information 53, an application name 1202A representing the name of the application processing information 53, and details of flow 1203A representing processing contents of a series of operations. The application name 1202A also serves as the name of the linking application.

Also, the details of flow 1203A include information 1204 on a component 18 used by the linking application, processing contents 1205, and identification information 1206 on the linked application to designate the linked application.

Note that the parameters illustrated in the figure are part of the parameters of the application processing information that may include more parameters. For example, in the case where a linking application links to multiple applications, parameters of the multiple linked applications are included.

Also, in the case where a linking application executes a series of operations, the information 1204 on the multiple components 18 are also set. Also, in the case where a linked application provided on the external system 40 is linked with the linking application, the external service processing unit 52 corresponding to the external system 40 is designated in the information 1204 of the component 18, and the application ID of the linked application is set as a parameter.

<Login Process>

Figure 7:
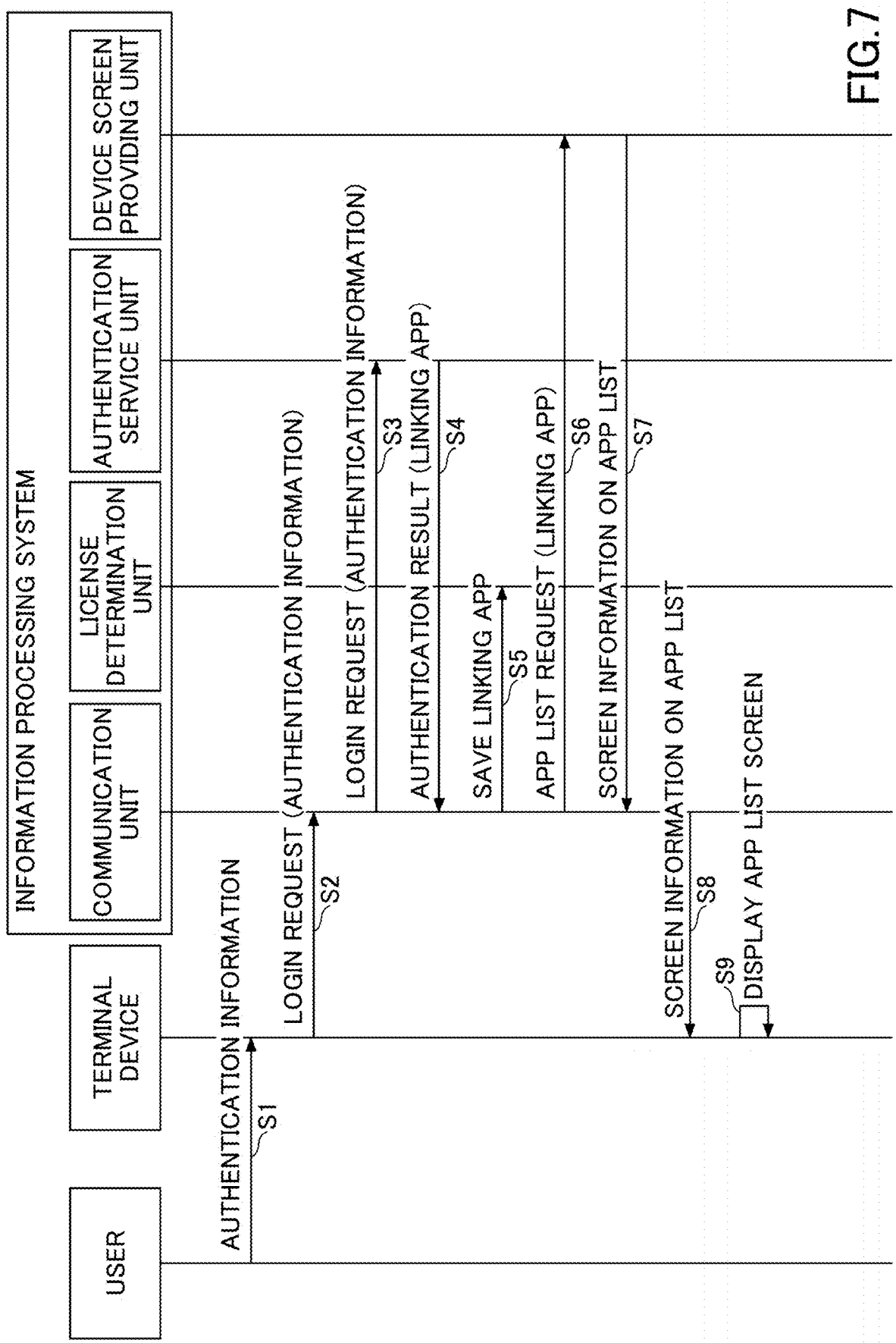
FIG. 7 illustrates an example of a sequence chart presenting steps of displaying a list of applications for each of which a user has a license.

First, with reference to FIG. 7, steps executed when a user logs in on the information processing system 10 for displaying a list of applications, will be described. FIG. 7 illustrates an example of a sequence chart presenting steps of displaying a list of applications for each of which a user has a license. Although FIG. 7 illustrates a case in which the user operates the terminal device 30, the processing flow may be the same in the case of operating the device 20.

At S1, first, when the terminal device 30 connects to the information processing system 10, the display control unit 32 of the terminal device 30 displays a login screen provided by the authentication service unit 14. The user enters authentication information (e.g., a user ID and a password) on the login screen. Note that it is favorable that the authentication service unit 14 can handle single sign-on.

At S2, the first communication unit 31 of the terminal device 30 transmits a login request having the authentication information specified, to the information processing system 10.

At S3, the communication unit 19 of the information processing system 10 receives the login request, and transfers the login request to the authentication service unit 14.

At S4, the authentication service unit 14 authenticates the user depending on whether the authentication information is registered in the user management unit 44 in FIG. 20B. In the illustration in FIG. 7, assume that authentication succeeds. The authentication service unit 14 returns the user information identified with the successful authentication to the communication unit 19. This user information includes "available applications".

At S5, the communication unit 19 transmits the "available applications" to the license determination unit 56. The license determination unit 56 saves the "available applications" after the user logged in until the user logs out. In this way, it becomes unnecessary for the communication unit 19 to request the authentication service unit to execute authentication every time a screen transition occurs on the terminal device 30. This is effective in the case where the authentication service unit 14 is part of an external system.

At S6, the communication unit 19 transmits a request for a list of applications in which "available applications" are specified, to the device screen providing unit 47. Further, an application having no application to be linked may also be included in the list of applications.

At S7, the device screen providing unit 47 obtains the screen information 54 on "available applications" from the application processing information storage unit 17. The screen information 54 may be constituted with icon images of linking applications. The device screen providing unit 47 transmits the screen information on the list of applications as a list of linking applications to the communication unit 19.

At S8, the communication unit 19 transmits the screen information on the list of applications to the terminal device 30.

Figure 8:
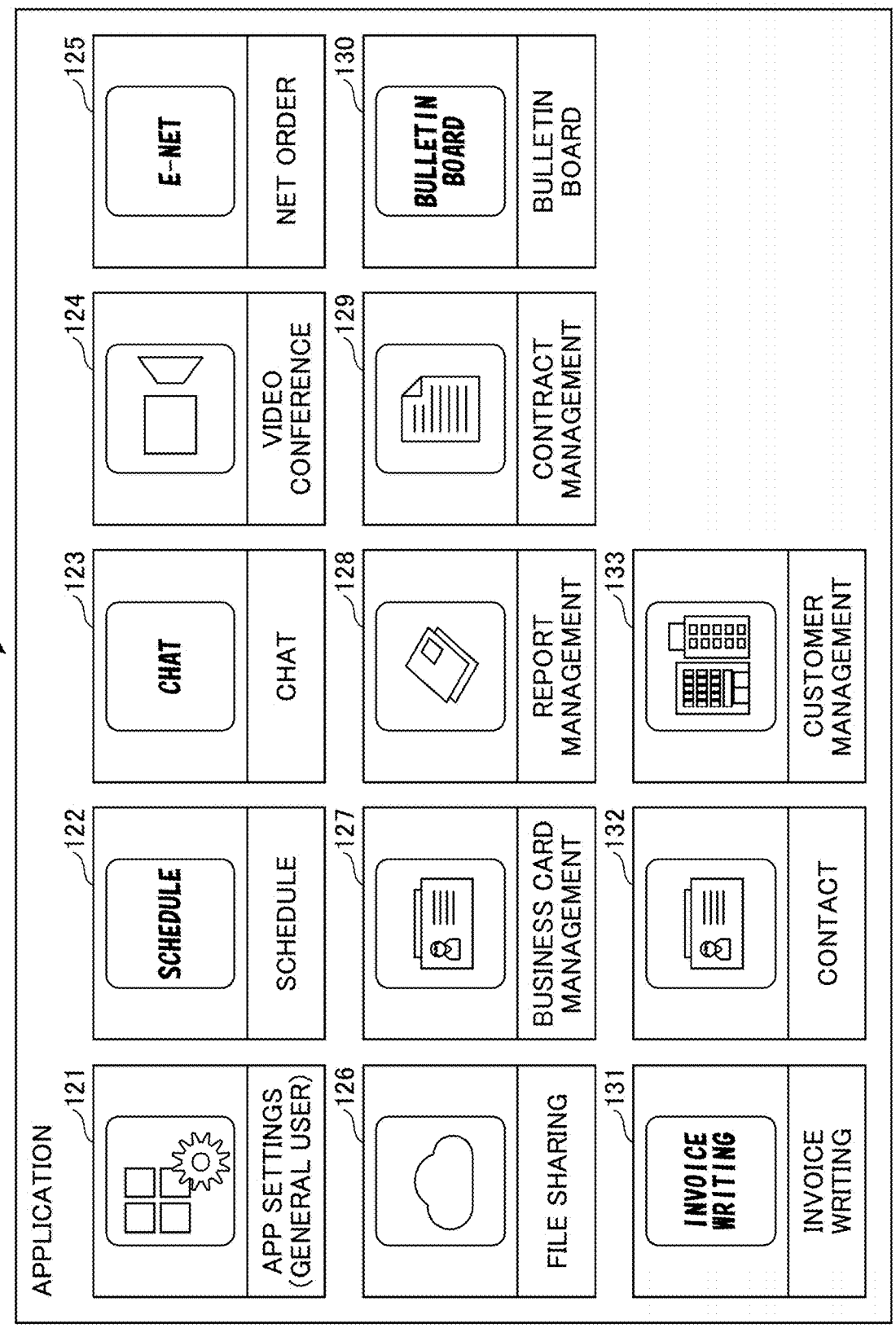
FIG. 8 illustrates an example of a screen for listing applications.

At S9, the first communication unit 31 of the terminal device 30 receives the screen information on the list of applications, and the display control unit 32 displays a screen for listing the applications on the display 506. FIG. 8 illustrates an example of a screen for listing applications.

In this way, the user can display on the terminal device 30 or the device 20 the list of linking applications for each of which the user has a license.

<Example of Screen for Listing Applications>

FIG. 8 illustrates an example of a screen 120 for listing applications. The screen 120 for listing applications is a list of icons of linking applications for each of which the user has a license. For example, in FIG. 8, icons of linking applications are displayed that include an application setting application 121, a schedule management application 122, a chat application 123, a video conference application 124, a net order application 125, a file sharing application 126, the business card management application 127, a report writing application 128, a contract management application 129, a bulletin board application 130, an invoice writing 131, a contact (address book) application 132, and the customer management application 133.

In an aspect of the present embodiment, for the sake of convenience in the following description, the report writing application 128 will be described as a linking application (the application A). Also, the business card management application 127 will be described as a linked application (the application B). In FIG. 8, the icon of the business card management application 127 is displayed because the user using the terminal device 30 has a license of the business card management application 127. In the case where the user using the terminal device 30 does not have a license of the business card management application 127, the icon of the business card management application 127 is not displayed on the screen 120 for listing applications.

Note that the relationship between a linking application and a linked application depends on which application the user executes. For example, in the case where the application A is executed and the application A uses a function of the application B, the application A is a linking application and the application B is a linked application. However, in the case where the function of the application A can also be used from the application B, if the user activates the application B, the application B is a linking application, and the application A is a linked application. Therefore, one application can serve as either of a linking application or a linked application.

FIG. 9 illustrates an example of a screen 140 of a customer management application displayed on the terminal device 30 in the case where the customer management application is executed. The customer management application 133 is an application for the user to manage business customers. The customer management application 133 includes records of customers each including fields of customer name 141, address 142, industry 143, category 144, and updated date 145.

The field of customer name 141 represents a company name of the customer that is commonly used.

The field of address 142 represents a location of the customer's head office, sales office, branch office, or the like.

The field of industry 143 represents a type of business or sales of the customer.

The field of category 144 is set with any information item such as importance to the user.

The field of updated date 145 represents the latest date of editing the customer information.

Each of these fields can be entered manually by the user. Also, in the case where the customer management application 133 serves as a linked application, the information can be received from the linking application. In the case where the customer management application 133 serves a linking application, the information can be obtained from the linked application.

FIG. 10 illustrates an example of a screen 150 of a business card management application displayed on the terminal device 30 in the case where the business card management application 127 is executed. The business card management application 127 is an application for the user to manage obtained business cards. The business card management application 127 includes records of business cards each including fields of image data 151, name 152, contact 153, tag 154, and date of receipt 155.

The field of image data 151 represents image data printed on the business card scanned by the device 20.

The field of name 152 represents a name of the customer obtained from the image data of the business card by OCR processing, or a name manually entered by the user.

The field of contact 153 represents a contact of the customer obtained from the image data by OCR processing, or a contact entered manually by the user.

The field of tag 154 is set with any information item such as the type of customer (counterpart, partner, etc.).

The field of date of receipt 155 represents a date when the user received the business card (a date when the device scanned the business card or when the user entered a data item).

Note that the information illustrated in FIGS. 9 and 10 is stored in the user data storage unit 59.

<Execution of Linking Application>

Figure 11:
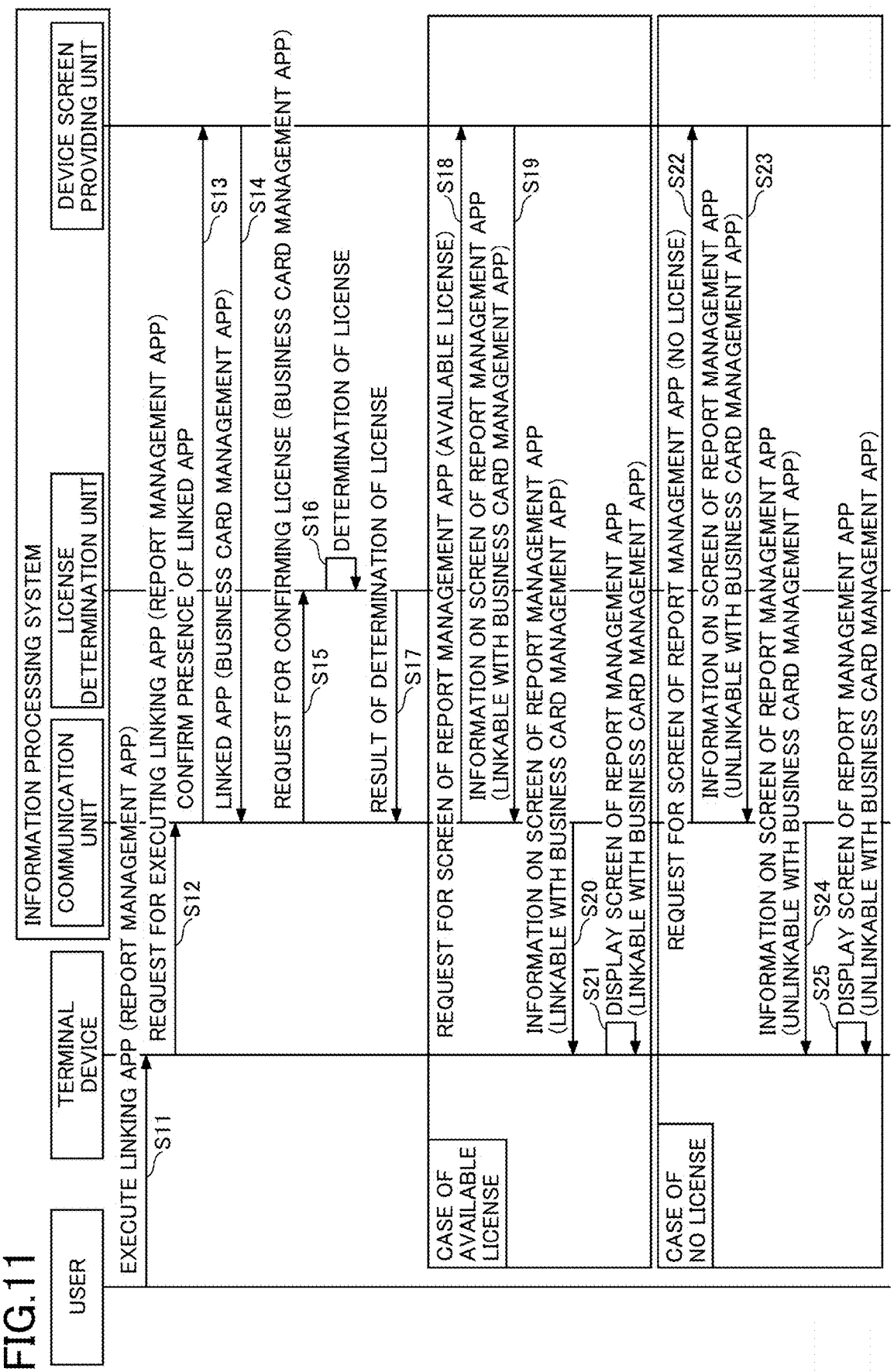
FIG. 11 is an example of a sequence chart illustrating steps executed by the information processing system in the case where a user makes a request for starting execution of a linking application.

Next, a method of displaying a screen of a linking application that is displayed in the case where the user executes the linking application, will be described. FIG. 11 is an example of a sequence chart illustrating steps executed by the information processing system 10 in the case where a user makes a request for starting execution of a linking application. Although FIG. 11 illustrates a case in which the user operates the terminal device 30, the processing flow may be the same in the case of operating the device 20.

At S11, the user presses a linking application (e.g., the report writing application 128) on the screen 120 for listing applications, to start execution of the linking application. The operation reception unit 33 of the terminal device 30 receives the press operation performed on the linking application.

At S12, the first communication unit 31 of the terminal device 30 transmits a request for executing the linking application to the information processing system 10.

At S13, the communication unit 19 of the information processing system 10 receives the request for executing the linking application, and makes an inquiry to the device screen providing unit 47 for whether there are any linked applications with respect to the linking application.

At S14, the device screen providing unit 47 refers to the application processing information storage unit 17 in FIG. 19, to determine whether any linked application is associated with the linking application. If associated, the device screen providing unit 47 obtains the linked application from the application processing information storage unit 17. Here, suppose that a linked application (e.g., the business card management application) is associated. The device screen providing unit 47 returns the identification information on the linked application to the communication unit 19.

At S15, the communication unit 19 requests the license determination unit 56 to determine whether the login user has a license of the linked application.

At S16, the license determination unit 56 holds "available applications (licensed applications)" for the login user. The license determination unit 56 determines whether the user has a license of the linked application (the business card management application).

At S17, the license determination unit 56 returns the determination result as to whether the user has a license of the linked application (the business card management application), to the communication unit 19.

At S18, if the user has a license of the linked application, the communication unit 19 requests the device screen providing unit 47 to display a screen of the linking application in the case where the license is granted.

At S19, the device screen providing unit 47 obtains screen information corresponding to the case of the license being granted, from among items of screen information 54 associated with the linking application in the application processing information storage unit 17. The device screen providing unit 47 may obtain the user data of the linked application from the user data storage unit 59 as needed, to generate screen information. The device screen providing unit 47 transmits the screen information on the linking application generated based on this screen information to the communication unit 19.

At S20, the communication unit 19 transmits the screen information on the linking application that can be linked with the linked application to the terminal device 30.

At S21, the first communication unit 31 of the terminal device 30 receives the screen information, and the display control unit 32 displays a screen of the linking applications that can be linked with the linked application, on the display 506. An example of this screen is illustrated in FIG. 13.

At S22, if the user has no license of the linked application, the communication unit 19 requests the device screen providing unit 47 to display a screen of the linking application in the case where no license is granted.

At S23, the device screen providing unit 47 obtains screen information corresponding to the case of no license being granted, from among items of screen information 54 associated with the linking application in the application processing information storage unit 17. The device screen providing unit 47 transmits the screen information on the linking application generated based on this screen information to the communication unit 19.

At S24, the communication unit 19 transmits screen information on the linking application that cannot be linked with the linked application, to the terminal device 30.

At S25, the first communication unit 31 of the terminal device 30 receives the screen information, and the display control unit 32 displays a screen of the linking applications that are unlinkable with the linked application, on the display 506. An example of this screen is illustrated in FIG. 14.

Figure 12:
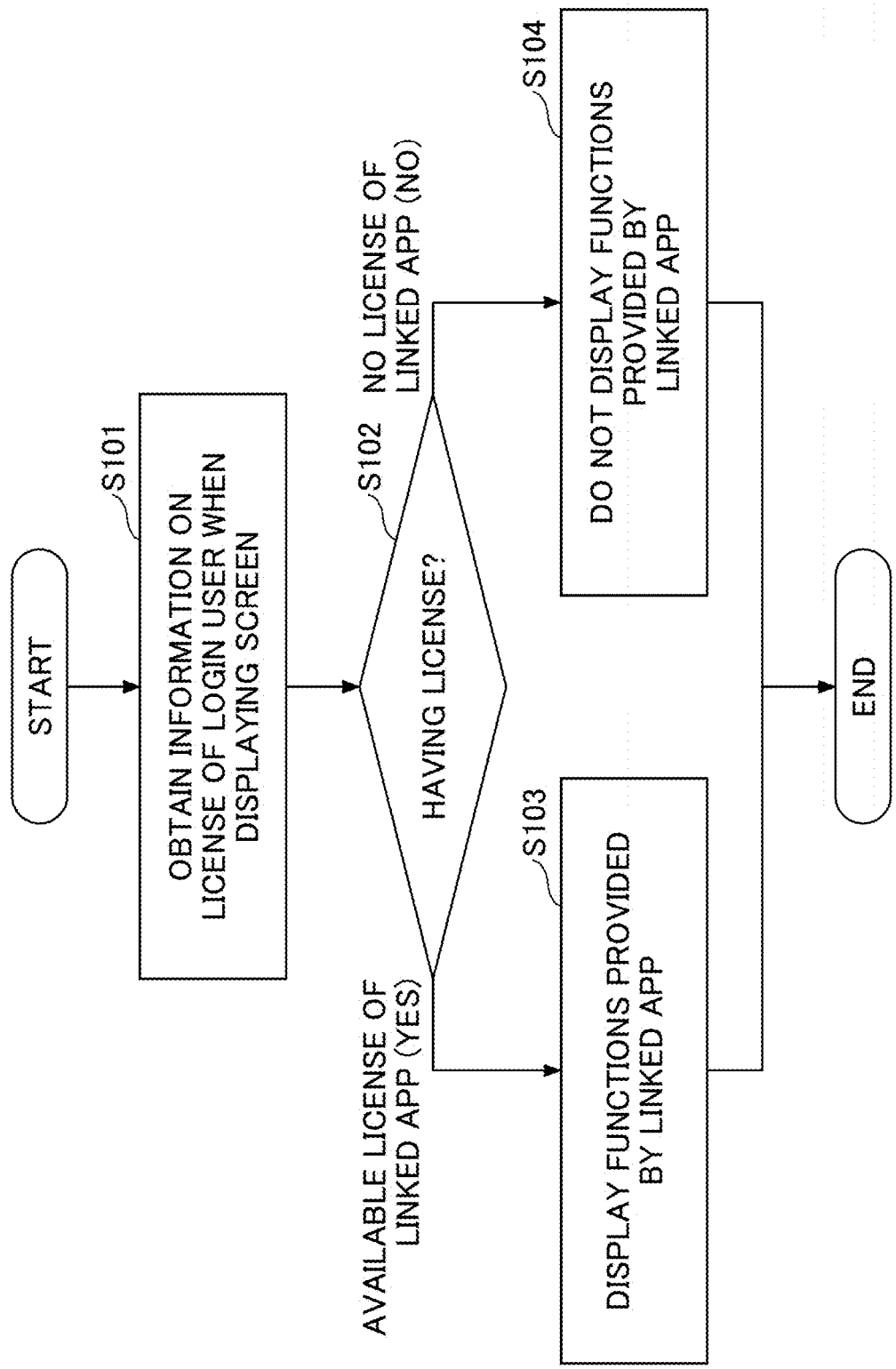
FIG. 12 is a diagram illustrating contents of determination executed at Step S16 in FIG. 11 by a license determination unit.

FIG. 12 is a diagram illustrating contents of determination executed at Step S16 in FIG. 11 by the license determination unit 56. When the user displays the screen of the linking application, the license determination unit 56 determines whether the user who is being logged in has a license of the linked application (S101).

If the login user has a license of the linked application (YES at S102), the device screen providing unit 47 displays functions provided by the linked application on a screen of "available applications" for the user (S103).

If the login user has no license of the linked application (YES at S102), the device screen providing unit 47 displays functions provided by the linked application on a screen of "available applications" for the user (S104).

In this way, the information processing system 10 controls displaying and hiding of items for establishing linkage with the linked application on the screen of the linking application. Therefore, in the case where a user having a license of a linking application does not have a license of a linked application, the linking application can be prevented from establishing a linkage with the linked application.

<Example of Screen of Linking Application>

FIG. 13 is an example of a screen 160 for report writing of a linking application (the report writing application) that can be linked with a linked application, displayed on the terminal device 30. The linked application is the business card management application. The screen 160 for report writing includes a date and time entry 161, a customer name entry 162, a visitor entry 163, a subject entry 164, and a contents of business entry 165.

The date and time entry 161 is constituted with entries into which the user enters the date and time of an activity. In FIG. 13, the current date and time are automatically displayed.

The customer name entry 162 is an entry into which the user enters the name of a company that the user visited (or made a call or the like).

The visitor entry 163 is an entry into which the user enters the name of a person (an employee) of the company that the user visited (or made a call or the like). The visitor entry 163 includes the button 111 labeled "select from among business card information items". The button 111 labeled "select from among business card information items" is a display for the user to use a function provided by the linked application. Therefore, if the user who does not have a license of the business card management application attempts to execute the report writing application, the button 111 labeled "select from among business card information items" is not displayed. Note that below the button 111 labeled "select from among business card information items", there is an entry 166 to display names entered in the past.

The subject entry 164 is an entry into which the user enters a title of business contents with the customer, such as a project name.

The contents of business entry 165 is an entry for entering any information item that the user saw and heard.

FIG. 14 is an example of a screen of a linking application (the report writing application) that cannot be linked with a linked application, displayed on the terminal device 30. When describing FIG. 14, differences from FIG. 13 will be mainly described. As illustrated in FIG. 14, on the screen of the linking application that cannot be linked with a linked application, a button 111 labeled "select from among business card information items" is not displayed in the visitor entry 163. Therefore, in the case where a user who does not have a license of the business card management application executes the report writing application, this makes it difficult for the user to cause the report writing application to link with the business card management application.

Note that in FIG. 13, although the button 111 labeled "select from among business card information items" is displayed, part of the business card information (e.g., newly registered business card information items) may be displayed. Also, the name of the business card information may be displayed in the visitor entry 163.

FIGS. 15A-15B illustrate an example of a screen 170 of business card information displayed by the report writing application in the case where the button 111 labeled "select from among business card information items" is pressed.

The screen 170 of business card information includes a search entry 171, a business card list entry 172, and a selection button 173.

The search entry 171 is an entry into which the user enters a keyword to search for business card information.

The business card list entry 172 is an entry for displaying names or the like of business card information matching the keyword. The report writing application transmits the keyword to the information processing system 10, and the linkage processing unit 57 of the information processing system 10 transmits the keyword to the linked application (the business card management application). The business card management application transmits business card information items matching the keyword, from the user data storage unit 59 to the terminal device 30.

The selection button 173 is a button to receive input of a name selected in the business card list entry 172.

Once the user presses the selection button 173, the name selected in the business card list entry 172 is set into the entry 166, as illustrated in FIG. 15B. Therefore, the user can use data from the linked application (the business card management application) to write a report.

<Branches in Processing Linking Application Depending on Availability of License of Linked Application>

In FIGS. 13 and 14, as an example in which a function of the linking application is controlled depending on availability of a license of the linked application, the case in which displaying or hiding of a button is controlled, is described. Other than displaying or hiding of a button, as another example in which a function of the linking application is controlled depending on availability of a license of the linked application, control of branching in processing will be described.

Also, for the sake of convenience of description, it is assumed in the following description that the linking application is the business card management application, and the linked application is the customer management application. In this way, the relationship between the linking application and the linked application is not fixed. An application activated by the user operating the terminal device 30 is the linking application. As the business card management application includes names of customers and names of employees, these can be transmitted from the business card management application to the customer management application. If the user registers the business card information obtained from an employee of a customer registered in the business card management application as a visited location, in the case where the user executes the customer management application, it is displayed in a state of the name of the customer being entered; therefore, the user saves the time and effort of entering the names.

In other words, even if the user does not active the customer management application, and does not press a button such as the button 111 labeled "select from among business card information items", by simply activating the business card management application and registering a business card, in the case where a license of the customer management application is available, the business card management application can transmit the data to the customer management application. In other words, the information processing system 10 transmits the user data managed by the linking application to the linked application in the case where the user has a license of the linked application; or does not transmit the user data managed by the linking application to the linked application in the case where no license is available (branches of the processing).

However, in some cases, the user prefers explicitly transmitting a name of a customer or a name of an employee from the business card management application to the customer management application, by pressing a button such as the button 111 labeled "select from among business card information items" in the customer management application. Therefore, it is desirable that the user can set whether to establish linkage automatically.

FIGS. 16A-16B illustrate an example of a setting screen on which a user sets whether to cause a linking application to execute automatic linkage. FIG. 16A is an example of a screen 180 for automatic linkage settings of the customer management application. The screen 180 for automatic linkage settings is a screen transitioned from a screen of the customer management application in response to an operation performed by the user. The screen 180 for automatic linkage settings includes an automatic registration setting entry 181 of customers. In the present embodiment, a radio button labeled "automatic registration" corresponds to turning on the setting of automatic linkage. In the case where the user registers a business card in the business card management application, if the customer management application is set with "automatic registration", the business card management application establishes linkage with the customer management application as long as the user who uses the business card management application has a license of the customer management application. In this case, the business card management application transmits the name and the like to the customer management application. In this way, the setting of automatic linkage is referenced in the case where an application set with the setting of automatic linkage serves as a linked application.

Also, in the case where the user sets the customer management application to execute automatic linkage (the setting of automatic linkage is turned on), the customer management application does not display (and does not need to display) a button to obtain a name of a customer or a name of an employee from the business card management application. In other words, the linking application set with the setting of automatic linkage turned on does not display an element for establishing linkage with the linked application. In this way, the setting of automatic linkage is also referenced in the case where an application set with the setting of automatic linkage is activated as a linking application.

Note that the screen 180 for automatic linkage settings includes an entry 182 for setting determination conditions of the same customer. If the customer information matches the customer name or address of the business card information, for example, the customer management application considers it as the same customer and does not register it automatically.

FIG. 16B is an example of a screen 190 for name identification settings of the business card management application, as a reference. The screen 190 for name identification settings is a screen transitioned from a screen of the business card management application in response to an operation performed by the user. The screen 190 for name identification settings includes an entry 191 for setting conditions of automatic name identification. The name identification refers to integration of data of the same person, the same company, the same household, or the like in multiple distributed databases, by assigning the same identification information. The setting of name identification is not related to the setting of automatic linkage. Note that on the screen 190 for name identification settings, the user can set one or more conditions from among matched full name, matched email address, and matched company name, as the name identification conditions 192.

With reference to FIG. 22, operations of the information processing system 10 depending on whether the setting of automatic linkage is turned on or off and whether the user has a license or not, will be complemented.

FIG. 22 illustrates contents of operations executed by the information processing system 10 depending on whether the setting of automatic linkage is turned on or off, and whether the user has a license of a linked application. As illustrated in FIG. 22, in order to display an item for establishing linkage with the linked application (e.g., the button 111 labeled "select from among business card information items") on a screen of the linking application, the following conditions need to be satisfied.

(i) The setting of automatic linkage of the linking application is turned off; and
(ii) The user has a license of the linked application.

If either of the condition (i) or (ii) is not satisfied, no item for establishing linkage with the linked application is displayed on the screen of the linking application. If both conditions (i) and (ii) are satisfied, and the displayed item for establishing linkage with the linked application (e.g., the button 111 labeled "select from among business card information items") is pressed on the screen of the linking application, the linking application establishes linkage with the linked application.

If the condition (i) is not satisfied, as the setting of automatic linkage is turned on, when activating the linked application (e.g., the customer management application), the linking application has already obtained the data from the linked application (no button for the linkage is required). However, in order to establish the linkage, the condition (ii) needs to be satisfied. If both conditions (i) and (ii) are not satisfied, the linkage cannot be established.

<Execution of Linking Application in the Case where Processing is Branched Depending on Availability of License of Linked Application>

Figure 17:
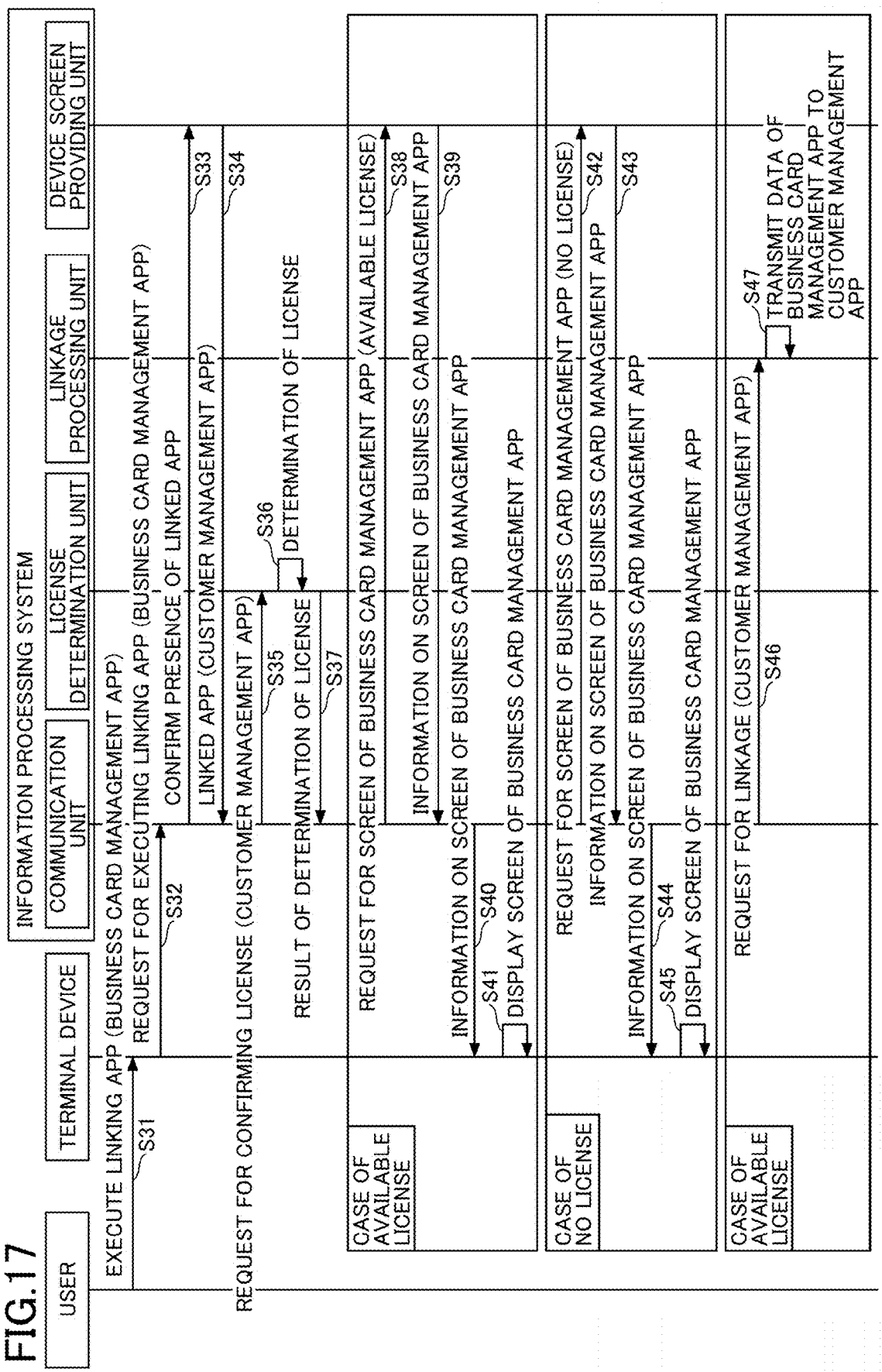
FIG. 17 is an example of a sequence chart executed in the case where a user executes a linking application, in which processing executed by the information processing system branches depending on availability of a license of a linked application.

FIG. 17 is an example of a sequence chart executed in the case where a user executes a linking application, in which processing executed by the information processing system 10 branches depending on availability of a license of a linked application. Note that in the processing in FIG. 17, it is assumed that the setting of automatic linkage of the customer management application is turned on. Although FIG. 17 illustrates a case in which the user operates the terminal device 30, the processing flow may be the same in the case of operating the device 20.

At S31, the user presses the linking application (business card management application) on a screen for listing applications, to start execution of the linking application. The operation reception unit 33 of the terminal device 30 receives the press operation performed on the linking application.

At S32, the first communication unit 31 of the terminal device 30 transmits a request for executing the linking application to the information processing system 10.

At S33, the communication unit 19 of the information processing system 10 receives the request for executing the linking application, and makes an inquiry to the device screen providing unit 47 for whether there are any linked applications with respect to the linking application.

At S34, the device screen providing unit 47 refers to the application processing information storage unit 17 in FIG. 19, to determine whether any linked application is associated with the linking application. If associated, the device screen providing unit 47 obtains the linked application from the application processing information storage unit 17. Here, suppose that a linked application (e.g., the customer management application) is associated. The device screen providing unit 47 returns the identification information on the linked application to the communication unit 19.

At S35, the communication unit 19 requests the license determination unit 56 to determine whether the user has a license of the linked application.

At S36, the license determination unit 56 holds "available applications (licensed applications)" for the login user. The license determination unit 56 determines whether the user has a license of the linked application (the customer management application).

At S37, the license determination unit 56 returns the determination result of whether the user has a license of the linked application to the communication unit 19.

At S38, in the case where the user has a license of the linked application (the customer management application), the communication unit 19 requests the device screen providing unit 47 to display a screen of the linking application in the case where the license is granted.

At S39, the device screen providing unit 47 refers to the setting of automatic linkage of the linking application (the business card management application). The business card management application has the setting of automatic linkage undefined (no case of becoming the destination of data transmission). Also, in the case of the business card management application, the same screen information is assigned regardless of whether a license of the linked application is available or not. The device screen providing unit 47 obtains the screen information 54 associated with the linking application from the application processing information storage unit 17. The device screen providing unit 47 transmits the screen information on the linking application generated based on this screen information to the communication unit 19.

At S40, the communication unit 19 transmits the screen information on the linking application to the terminal device 30.

At S41, the first communication unit 31 of the terminal device 30 receives the screen information, and the display control unit 32 displays the screen of the linking application (the business card management application) on the display 506.

At S42, in the case where the user has no license of the linked application (the customer management application), the communication unit 19 requests the device screen providing unit 47 to display a screen of the linking application in the case where no license is granted.

At S43, the device screen providing unit 47 makes a determination in substantially the same way as at Step S39. The device screen providing unit 47 obtains the screen information 54 associated with the linking application from the application processing information storage unit 17. The device screen providing unit 47 transmits the screen information on the linking application generated based on this screen information to the communication unit 19.

At S44, the communication unit 19 transmits the screen information on the linking application to the terminal device 30.

At S45, the first communication unit 31 of the terminal device 30 receives the screen information, and the display control unit 32 displays the screen of the linking application (the business card management application) on the display 506. This screen is the same as the screen at Step S41.

At S46, in the case where the user has a license of the customer management application as the linked application, the communication unit 19 transmits a request for linkage to the linkage processing unit 57 in which the customer management application as the linked application is specified.

At S47, the linkage processing unit 57 refers to the setting of automatic linkage of the linked application (the customer management application). As the setting of automatic linkage of the customer management application is turned on, the linkage processing unit 57 transmits new data of the business card management application to the customer management application. Note that as the linked business card information has a flag turned on, the linkage processing unit 57 can be determined whether it is new.

The case of the user executing the customer management application will be complemented. In the customer management application, the business card management application is set as the linked application. Even in the case where the user who makes a request for execution of the customer management application has a license of the business card management application, the customer management application is set to accept the automatic linkage; therefore, the device screen providing unit 47 does not display information of the business card management application on the screen of the customer management application. In other words, as the information on the business card management application has already been transmitted to the customer management application, the device screen providing unit 47 does not display any display item (such as a button) for establishing linkage with the business card management application.

<Example of Transmitting Data Managed by Application>

FIGS. 18A-18C are diagrams illustrating data transmitted from a business card management application to a customer management application. FIG. 18A illustrates user data managed by the customer management application, and FIG. 18B illustrates user data managed by the business card management application. In a state of the user data managed by the customer management application as in FIG. 18A, the user has activated the business card management application and newly registered a business card. The registered business card has been registered as the last record in FIG. 18B.

In the case where the setting of automatic linkage of the customer management application is turned on, the linkage processing unit 57 of the information processing system 10 registers the new business card information transmitted by the business card management application to the information processing system 10, in the user data storage unit 59 of the customer management application. The linkage processing unit 57 registers the new business card information in the fields of the user data storage unit 59 of the customer management application, based on a table in which fields of the user data of the business card management application are associated with corresponding fields of the user data of the customer management application.

FIG. 18C illustrates user data of the customer management application in which part of the business card information is registered by automatic linkage. The business card information registered by the user in the business card management application is registered in the fields of customer name and address. Note that the field of updated date of the customer management application may be a date when the business card information was transferred. Also, the fields of industry and category are entered by the user after activating the customer management application.

In this way, in the case where the setting of automatic linkage of the customer management application is turned on, the information processing system 10 can transmit the user data of the business card management application to the customer management application.

<Other Examples of Linking Application and Linked Application>

In the present embodiment, the mainly described cases have been the report writing application and the business card management application, or the business card management application and the customer management application, as the linking application or the linked applications. However, various combinations can be considered for the linking application and the linked application.

In the case where the report writing application is the linking application and the schedule management application is the linked application, the user can register the date and time, the customer name, the visitor, and the like registered in the report writing application as a schedule in the schedule management application. Conversely, in the case where the schedule management application is the linking application and the report writing application is the linked application, the user can cause the schedule management application to register a schedule registered in the schedule management application, in the report writing application.

In the case where the schedule management application is the linking application and the customer management application is the linked application, the schedule management application obtains customer information from the customer management application, and registers the information on any date specified by the user.

In the case where the schedule management application is the linked application and the customer management application is the linking application, the customer management application can transmit the customer information to the schedule management application.

In the case where the schedule management application is the linking application and the business card management application is the linked application, the schedule management application obtains the name and the like from the business card management application, and registers those on any date specified by the user. In the case where the schedule management application is the linked application and the business card management application is the linking application, the business card management application can transmit the name and the like to the schedule management application.

Note that in any of the cases, the setting of automatic linkage may be turned on or turned off. In the case where the setting of automatic linkage is turned off, in some cases, the linking application displays information on the linked application.

<Main Effects>

As described above, in the case where a linking application is executed, the service providing system 100 of the present embodiment can control a function of a linking application according to the contractual information on the linking application and a linked application to be linked with the linking application. For example, the service providing system controls displaying and hiding of items for establishing linkage with the linked application on the screen of the linking application. Therefore, in the case where a user having a license of a linking application does not have a license of a linked application, the linking application can be prevented from establishing a linkage with the linked application. Also, in the case where the setting of automatic linkage of the linked application is turned on, the user data managed by the linking application can be registered in the linked application.

OTHER APPLICATION EXAMPLES

As described above, the best mode for implementing the present inventive concept has been described using the embodiments; note that the present inventive concept is not limited to such embodiments, and various modifications and substitutions can be made within a scope that does not deviate from the subject matter of the present inventive concept.

For example, in an example as illustrated in FIG. 5, the configuration is partitioned according to the primary functions, to facilitate understanding of the processing executed by the terminal device 30, the device 20, and the information processing system 10. The inventive concept of the present application is not limited by the manner of partitioning or naming of the processing units. The processing executed by the terminal device 30, the device 20, and the information processing system 10 can be further partitioned into a greater number of processing units depending on the contents of processing. Also, partitioning can be made so as to have a processing unit include more processing steps.

Also, a group of the devices described in the application example is merely indicative of one of multiple computing environments for implementing the embodiments disclosed in the present specification. In some embodiments, the information processing system 10 includes multiple computing devices such as a cluster of servers. The multiple computing devices are configured to communicate with each other via any type of communication link, including a network, a shared memory, and the like, to execute the processing disclosed in the present specification.

Further, the information processing system 10 can be configured to share processing steps disclosed in the present embodiment, for example, those in FIG. 11, in various combinations. For example, a process executed by a predetermined unit may be executed by multiple information processing apparatuses held in the information processing system 10. Also, the information processing system 10 may be configured as a single server device, or may be divided into multiple devices.

The functions of the embodiment described above can be implemented by one or more processing circuits. Here, in the present specification, the "processing circuit" includes various devices such as a processor that is programmed to execute functions by software such as a processor implemented by an electronic circuit; an application specific integrated circuit (ASIC), a digital signal processor (DSP), and a field programmable gate array (FPGA) designed to execute the functions described above; a device such as a conventional circuit module; and the like.

What is claimed is:

1. A service providing system comprising:
  an information processing system including an information processing apparatus including a memory and a processor; and
  a terminal device including a processor and configured to receive an execution request for a first application from a user, and send the execution request to the processor of the information processing apparatus,
  wherein the processor of the information processing apparatus is configured to store information on one or more applications for which the user has a license,
  in response to the execution request for the first application, identify a second application associated with the first application,
  determine whether the user who sent the execution request for the first application has a license for the identified second application,
  in response to determining that the user has a license for the identified second application, display functions of the second application on the screen of the first application,
  in response to determining that the user does not have the license for the second application, prevent displaying functions of the second application on the screen of the first application,
  store a setting specifying whether the second application accepts an automatic linkage from the first application, and
  in response to determining that the setting is set to accept the automatic linkage, even the user has the license of the second application, prevent displaying functions of the second application on the screen of the first application.

2. The service providing system as claimed in claim 1, wherein the information on the second application is a button for the first application to display user data managed by the second application.

3. The service providing system as claimed in claim 1, wherein depending on whether the user who sent the execution request for the first application has the license for the second application related to the first application, the processor of the information processing apparatus controls whether to register user data managed by the first application in user data of the second application.

4. The service providing system as claimed in claim 3, wherein in a case where the user who sent the execution request for the first application has the license for the second application related to the first application, the processor of the information processing apparatus registers the user data managed by the first application in the user data of the second application, and in a case where the user does not have the license for the second application, the processor of the information processing apparatus does not register the user data managed by the first application in the user data of the second application.

5. The service providing system as claimed in claim 1, wherein the processor is configured to: execute an authentication process for the user, and identify one or more applications available to the user after authentication, the first application being included in the one or more applications identified.

6. The service providing system as claimed in claim 5, wherein the processor is configured to: generate screen information of the identified one or more applications and transfer the generated screen information to the terminal device, and the terminal device is configured to receive the execution request for the first application from the user after authentication.

7. The service providing system as claimed in claim 1, wherein the first application and the second application are executable independently of each other.

8. A method comprising:
  receiving, by a terminal device, an execution request for a first application from a user;
  sending, by the terminal device, the execution request to a processor of an information processing apparatus;

storing, by the processor of the information processing apparatus, information on one or more applications for which the user has a license, in response to receiving the execution request for the first application from the terminal device, identifying by the processor of the information processing apparatus, a second application associated with the first application, determining, by the processor of the information processing apparatus, whether the user who sent the execution request for the first application has a license for the identified second application, in response to determining that the user has a license for the identified second application, displaying, by the processor of the information processing apparatus, functions of the second application on the screen of the first application, in response to determining that the user does not have the license for the second application, preventing, by the processor of the information processing apparatus, displaying functions of the second application on the screen of the first application, storing, by the processor of the information processing apparatus, a setting specifying whether the second application accepts an automatic linkage from the first application, and in response to determining that the setting is set to accept the automatic linkage, even the user has the license of the second application, preventing, by the processor of the information processing apparatus, displaying functions of the second application on the screen of the first application.

9. The method as claimed in claim 8, further comprising: executing an authentication process for the user; and identifying one or more applications available to the user after authentication, the first application being included in the one or more applications identified.

10. The method as claimed in claim 9, further comprising: generating screen information of the identified one or more applications and transfer the generated screen information to the terminal device; and receiving, by the terminal device, the execution request for the first application from the user after authentication.

11. The method as claimed in claim 8, wherein the first application and the second application are executable independently of each other.

12. One or more non-transitory computer-readable recording medium having computer-readable instructions stored thereon, which when executed, cause an information processing system to execute a method, wherein the information processing system includes an information processing apparatus including a memory and a processor, and a terminal device including a processor, the method comprising:

receiving, by the terminal device, an execution request for a first application from a user;

sending, by the terminal device, the execution request to a processor of an information processing apparatus;

storing, by the processor of the information processing apparatus, information on one or more applications for which the user has a license, in response to receiving the execution request for the first application from the terminal device, identifying by the processor of the information processing apparatus, a second application associated with the first application, determining, by the processor of the information processing apparatus, whether the user who sent the execution request for the first application has a license for the identified second application, in response to determining that the user has a license for the identified second application, displaying, by the processor of the information processing apparatus, functions of the second application on the screen of the first application, in response to determining that the user does not have the license for the second application, preventing, by the processor of the information processing apparatus, displaying functions of the second application on the screen of the first application, storing, by the processor of the information processing apparatus, a setting specifying whether the second application accepts an automatic linkage from the first application, and in response to determining that the setting is set to accept the automatic linkage, even the user has the license of the second application, preventing, by the processor of the information processing apparatus, displaying functions of the second application on the screen of the first application.

13. The non-transitory computer-readable recording medium as claimed in claim 12, further comprising: executing an authentication process for the user; and identifying one or more applications available to the user after authentication, the first application being included in the one or more applications identified.

14. The non-transitory computer-readable recording medium as claimed in claim 13, further comprising: generating screen information of the identified one or more applications and transfer the generated screen information to the terminal device; and receiving, by the terminal device, the execution request for the first application from the user after authentication.

15. The non-transitory computer-readable recording medium as claimed in claim 12, wherein the first application and the second application are executable independently of each other.

* * * * *